(12) United States Patent
Utagawa

(10) Patent No.: US 7,745,772 B2
(45) Date of Patent: Jun. 29, 2010

(54) IMAGE FORMING STATE DETECTION DEVICE

(75) Inventor: Ken Utagawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 191 days.

(21) Appl. No.: 11/920,839

(22) PCT Filed: May 30, 2006

(86) PCT No.: PCT/JP2006/310811

§ 371 (c)(1),
(2), (4) Date: Nov. 21, 2007

(87) PCT Pub. No.: WO2006/129677

PCT Pub. Date: Dec. 7, 2006

(65) Prior Publication Data

US 2008/0277566 A1    Nov. 13, 2008

(30) Foreign Application Priority Data

May 30, 2005    (JP) .............................. 2005-157314

(51) Int. Cl.
H01L 27/00     (2006.01)
G01B 9/04      (2006.01)
G03B 13/00     (2006.01)
G03B 3/00      (2006.01)

(52) U.S. Cl. ................. 250/208.1; 250/201.8; 348/345; 396/104

(58) Field of Classification Search ............. 250/208.1, 250/201.1–201.5, 201.8, 204, 221, 227.2, 250/227.21; 348/333.12, 345, 349, 352, 348/468; 396/104, 121, 123, 125, 128, 139; 356/3.13, 3.14, 3.11, 4.04, 126; 382/250, 382/251, 278

See application file for complete search history.

(56) References Cited

U.S. PATENT DOCUMENTS 4,410,804 A    10/1983    Stauffer (Continued)

FOREIGN PATENT DOCUMENTS

DE          33 20 096 A1    12/1983

(Continued)

OTHER PUBLICATIONS

Co-pending U.S. Appl. No. 12/038,731.

(Continued)

*Primary Examiner*—Georgia Y Epps
*Assistant Examiner*—Don Williams
(74) *Attorney, Agent, or Firm*—Oliff & Berridge, PLC

(57) ABSTRACT

An image forming state detection device comprises a micro-lens array that is disposed at a position set apart from a predetermined focal plane of an image forming optical system by a specific distance and includes a plurality of micro-lenses arrayed with a predetermined pitch, a light-receiving portion array that includes a plurality of light-receiving portions each corresponding to one of the micro-lenses in the micro-lens array and receives an image on the predetermined focal plane via the individual micro-lenses, a signal string extracting means that extracts a pair of signal strings corresponding to images, formed with light fluxes having passed through different pupil areas of the image forming optical system, based upon light reception outputs obtained from the plurality of light-receiving portions, and an image forming state calculating means that calculates an image forming state at the image forming optical system by detecting an offset with regard to the phases of the pair of signal strings extracted by the signal string extracting means.

20 Claims, 26 Drawing Sheets

U.S. PATENT DOCUMENTS

| | | | |
|---|---|---|---|
| 4,417,139 A | | 11/1983 | Kusaka |
| 4,492,449 A | | 1/1985 | Oinoue et al. |
| 4,561,749 A | | 12/1985 | Utagawa |
| 4,644,148 A | | 2/1987 | Kusaka et al. |
| 4,734,571 A | * | 3/1988 | Hamada et al. .......... 250/201.8 |
| 4,766,302 A | * | 8/1988 | Ishida et al. ............. 250/201.8 |
| 5,422,701 A | | 6/1995 | Utagawa |
| 5,572,011 A | | 11/1996 | Goto |
| 6,819,360 B1 | | 11/2004 | Ide et al. |
| 2006/0291845 A1 | | 12/2006 | Sugimoto |

FOREIGN PATENT DOCUMENTS

| | | |
|---|---|---|
| EP | 1 887 399 A1 | 2/2008 |
| JP | A-58-087512 | 5/1983 |
| JP | A-59-160109 | 9/1984 |
| JP | A-59-208515 | 11/1984 |
| JP | A-07-199052 | 8/1995 |
| JP | A-10-096852 | 4/1998 |
| JP | A-2001-330769 | 11/2001 |
| JP | A-2002-174766 | 6/2002 |
| JP | A-2007-011314 | 1/2007 |

OTHER PUBLICATIONS

Ren Ng et al., "Light Field Photography with a Hand-held Plenoptic Camera," *Stanford Tech Report*, CTSR Feb. 2005, pp. 1-11.

Office Action issued in U.S. Appl. No. 12/038,731 on Mar. 16, 2010.

* cited by examiner

FIG.7
(A) 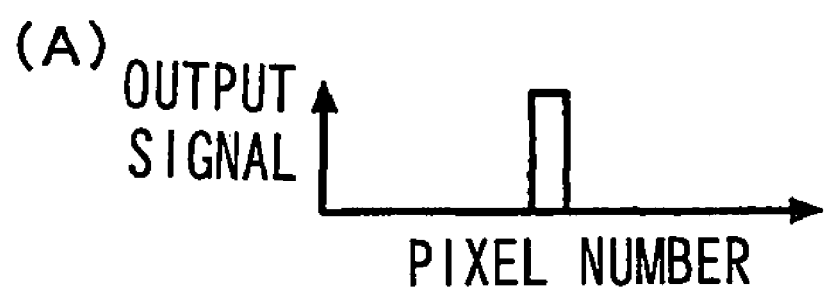
(B) 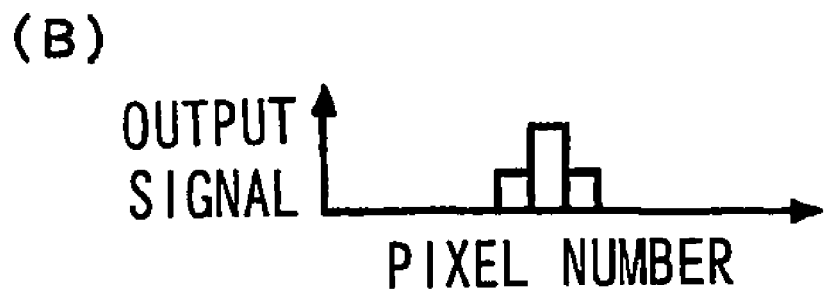

FIG.24

FIG.26
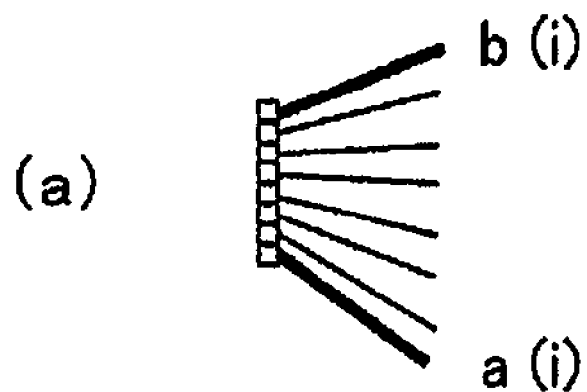
(a)
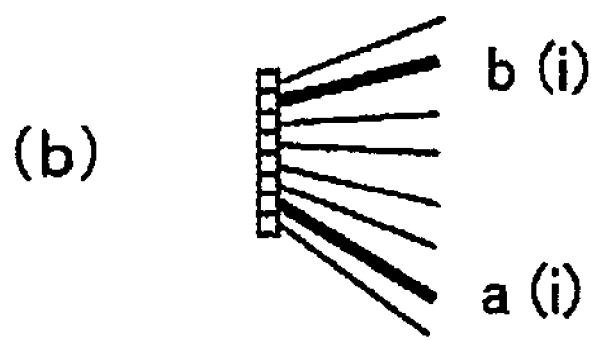
(b)
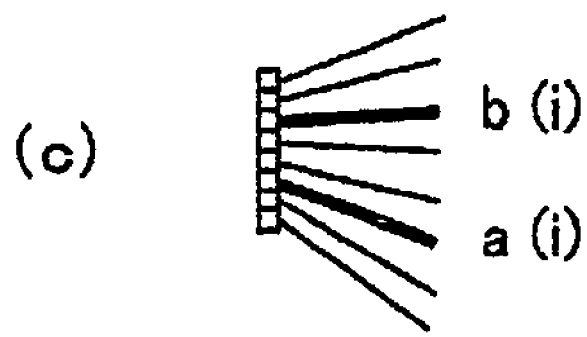
(c)
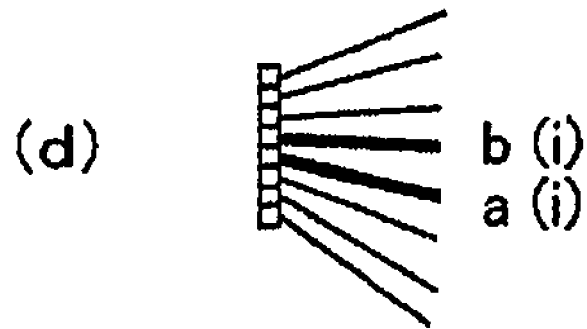
(d)

IMAGE FORMING STATE DETECTION DEVICE

TECHNICAL FIELD

The present invention relates to an image forming state detection device to be utilized to detect the state of image formation at an image forming optical system included in a camera, a field scope or the like.

BACKGROUND ART

A focal point detection device in a single lens reflex camera in the related art typically adopts the split pupil image reforming method (see patent reference literature 1 and the like). In this method, images are individually reformed via a pair of image reforming lenses by using image forming light fluxes having been transmitted through different areas on the exit pupil of the photographic lens of the camera, the patterns of the pair of secondary images thus reformed are detected with a line sensor and a defocus signal is generated based upon the extent of pattern misalignment manifested by the pair of the secondary images.

In this method, the detection pitch at the focal point detection plane (predetermined focal plane), i.e., the pixel pitch of virtual pixels achieved by reverse-projecting (projecting the line sensor back onto the focal point detection plane via the image reforming lenses), is determined in correspondence to the projection magnification rate and the pixel pitch with which the pixels at the line sensor are disposed. Accordingly, by disposing pixels in a very dense array at the line sensor, very accurate focal point detection is enabled.

It is to be noted that the term "focal point detection plane" refers to a plane at which focus adjustment is attempted, e.g., a plane conjugate with the film surface.

Patent reference literature 1: Japanese Laid Open Patent Publication No. 2002-174766

DISCLOSURE OF THE INVENTION

Problems to be Solved by the Invention

However, the method normally requires a focal point detection area on the focal point detection plane to range over a length of 3~7 mm. Thus, in order to form an image over the focal point detection are a via a single image reforming lens onto the sensor, the distance from the focal point detection plane to the image reforming lens must be set at a specific length (several times the 3~7 mm length), making it difficult to provide the focal point detection device as a compact unit. In addition, since the image reforming lenses and the sensor are set over a significant distance from each other as well, the accuracy of the group adjustment executed to align the two line sensor images cannot be raised readily. Accordingly, there are issues that need to be addressed, such as poor detection accuracy along diagonal directions even though good accuracy is assured along the longitudinal direction running perpendicular to the direction in which the focal point detection area extends.

The present invention provides a compact image forming state detection device assuring a high level of detection accuracy and a camera in which the image forming state detection device is utilized as a focal point detection device.

In addition, the present invention provides a focal point detection unit that may be adopted to realize a compact and accurate image forming state detection device.

Means for Solving the Problems

An image forming state detection device according to the present invention comprises: a micro-lens array that is disposed at a position set apart from a predetermined focal plane of an image forming optical system by a specific distance and includes a plurality of micro-lenses arrayed with a predetermined pitch; a light-receiving portion array that includes a plurality of light-receiving portions each corresponding to one of the micro-lenses in the micro-lens array and receives an image on the predetermined focal plane via the individual micro-lenses; a signal string extracting means that extracts a pair of signal strings corresponding to images formed with light fluxes having passed through different pupil areas of the image forming optical system, based upon light reception outputs obtained from the plurality of light-receiving portions; and an image forming state calculating means that calculates an image forming state at the image forming optical system by detecting an offset manifested with regard to phases of the pair of signal strings extracted by the signal string extracting means.

The image forming state detection device, wherein: the signal string extracting means extracts the pair of signal strings by selecting specific light reception outputs corresponding to the pupil areas at each of the plurality of light-receiving portions disposed in conjunction with one of the micro-lenses.

A pitch Pd of images of the plurality of light-receiving portions reverse-projected onto the predetermined focal plane is smaller than a pitch P of the micro-lenses. The specific distance L is determined based upon a pitch with which the micro-lenses are arrayed and the size of the pupil areas.

With P representing the pitch with which the micro-lenses are arrayed, Fp representing an F value of light fluxes from the pupil areas that enter one of the light-receiving portions and Q representing a number of pupil areas defined when the F value of the light fluxes from the pupil areas is 2, the specific distance L is expressed as; $P \times Fp > L \geq P \times Fp/(Q-4)$.

The image forming state detection device according to the present invention, wherein: a light-receiving portion group is constituted of the plurality of light-receiving portions each corresponding to one of the micro-lenses; and the signal string extracting unit extracts the signal strings by adopting; a first extraction method whereby one portion of light reception outputs corresponding to images received by individual light-receiving portion groups each disposed in conjunction with one of the micro-lenses are selected as a first signal string and light reception outputs different from the light reception outputs selected as the first signal string are selected as a second signal string; and a second extraction method whereby light reception outputs from a specific light-receiving portion group are selected as a first signal string and light reception outputs from a light-receiving portion group different from the light-receiving portion group selected for extraction of the first signal string are selected as a second signal string.

An image forming state detection device according to other aspect of the invention comprises: the light-receiving portion array including a first array group with the plurality of light-receiving portions disposed along a first direction and a second array group with the plurality of light-receiving portions disposed along a second direction different from the first direction, and wherein: light-receiving portion/micro-lens pairs made up with the light-receiving portions disposed along the first direction and micro-lenses corresponding to the light-receiving portions, and light-receiving portion/micro-lens pairs made up with the light-receiving portions disposed along the second direction and micro-lenses corresponding to the light-receiving portions are set so as to achieve a checkerboard pattern.

The image forming state detection device having the light-receiving portion array including a first array group with the plurality of light-receiving portions disposed along a first direction and a second array group with the plurality of light-receiving portions disposed along a second direction different from the first direction, wherein: the first array group and the second array group may be set so as to achieve a checkerboard pattern.

The image forming state detection device having the light-receiving portion array including a first array group with the plurality of light-receiving portions disposed along a first direction and a second array group with the plurality of light-receiving portions disposed along a second direction different from the first direction, wherein: the micro-lens array corresponding to the first array group can assume a pitch different from a pitch of the micro-lens array corresponding to the second array group.

The image forming state detection device having the light-receiving portion array including a first array group with the plurality of light-receiving portions disposed along a first direction and a second array group with the plurality of light-receiving portions disposed along a second direction different from the first direction wherein: the light-receiving portions in the first array group each can assume a range along the first direction, which is greater than a range assumed by the light-receiving portions in the second array group along the second direction.

It is possible that the light-receiving portion array includes light-receiving portions having different spectral sensitivity characteristics. It is to be noted that light-receiving portions having specific spectral sensitivity characteristics are arrayed with a higher level of density than light-receiving portions having other spectral characteristics.

The image forming state detection device having the light-receiving portion array including a first array group with the plurality of light-receiving portions disposed along a first direction and a second array group with the plurality of light-receiving portions disposed along a second direction different from the first direction wherein: the first array group includes a plurality of light receiving array groups having different spectral sensitivity characteristics, and the plurality of light receiving array groups each include light-receiving portions having specific spectral sensitivity characteristics. Furthermore, the light-receiving portions having different spectral characteristics assume sizes different from one another.

This invention provides a camera equipped with an internal focal point detection device constituted with the image forming state detection device described above. Furthermore, this invention provides a light receiving unit comprising the micro-lens array and the light-receiving portion array in an image forming state detection device described above.

Effect of the Invention

According to the present invention, a compact image forming state detection device assuring a high level of detection accuracy is achieved. It also provides a camera equipped with such a compact image forming state detection device to function as its internal focal point detection device. In addition, the present invention provides a focal point detection unit that may be adopted to achieve a compact image forming state detection device.

BRIEF DESCRIPTION OF THE DRAWINGS

FIG. 7
Illustrations provided to facilitate an explanation of the extent of blurring optimal for the focal point detection unit 5

Figure 1:
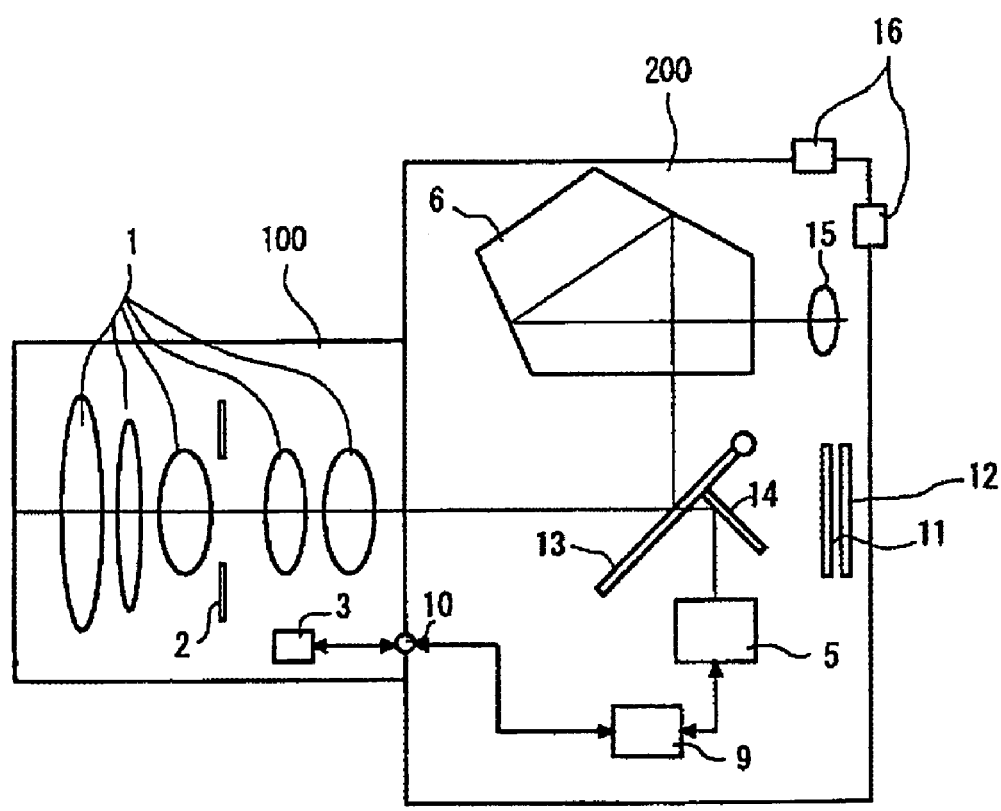
FIG. 1
The structure adopted in the electronic camera system achieved in a first embodiment FIG. 2
A schematic optical path diagram showing the optical path in the focal point detection unit 5 and the area around the focal point detection unit 5

An illustration of a reverse-projected image in an example of an image forming state detection device

FIG. 22

An illustration of the optical system included in an example of an image forming state detection device

FIG. 23

An illustration of a first sampling method

FIG. 24

An illustration of signal strings offset relative to one another

FIG. 25

An illustration of a second sampling method

FIG. 26

A method that may be adopted when selecting signal strings in the second sampling method

FIG. 27

A flowchart of the image shift detection operation

BEST MODE FOR CARRYING OUT THE INVENTION

The following is an explanation of the image forming state detection device achieved in an embodiment of the present invention and adopted in a camera. The concept of the present invention is first explained in reference to FIGS. 19 through 22, followed by an explanation of specific examples.

When an image forming state detection device is utilized as a focal point detection device in a camera, the predetermined focal plane explained earlier is optically equivalent to the image forming surface of an imaging device that captures a subject image via an image forming optical system. The focal point detection device shown in FIG. 19 includes a plurality of micro-lenses 182 and 183, set apart by a predetermined distance from a predetermined focal plane 181 of the image forming optical system and arrayed with a predetermined pitch, and a pair of conversion element arrays 184 and 185 made up with sets of photoelectric conversion elements with each set of photoelectric conversion elements provided in correspondence to one of the micro-lenses 182 and 183.

The focal point detection device further includes a signal string extraction unit 191 that, based upon the outputs from the pair of conversion element arrays 184 and 185, extracts a pair of signal strings a(i) and b(i) corresponding to images formed with light fluxes having passed through different pupil areas at the image forming optical system, and an arithmetic operation unit 192 that determines a defocus quantity, indicating the extent of defocusing representing the image forming state at the image forming optical system by detecting the extent of offset between the phases of the pair of signal strings a(i) and b(i) extracted by the signal string extraction unit 191 (i.e., by determining through arithmetic operation the correlation between the images).

Figure 20:
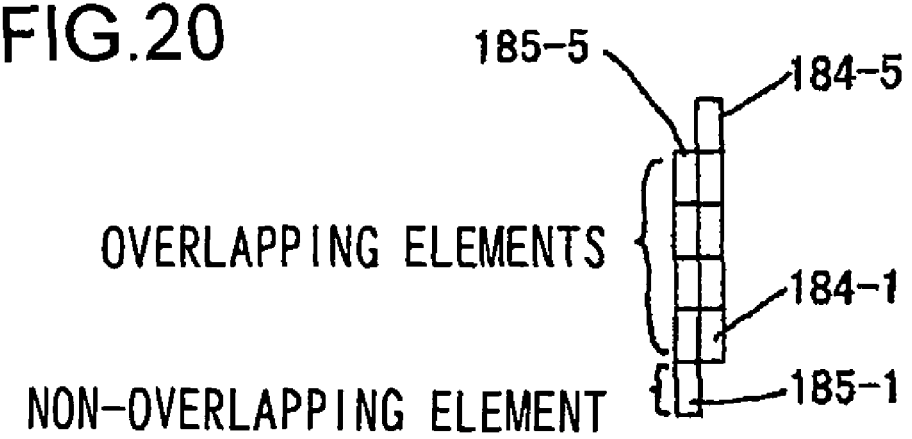
Figure 21:
FIG. 21

Signals need to be extracted from at least a four-pixel range to enable correlation operation executed to determine the correlation between the pair of images. In other words, reverse-projected images of at least four photoelectric conversion elements in one photoelectric conversion element array among the reverse-projected images of the photoelectric conversion elements in the pair of photoelectric conversion element arrays formed on the focal point detection plane must overlap reverse-projected images of the four photoelectric conversion elements in the other photoelectric conversion element array. Accordingly, the photoelectric conversion element arrays 184 and 185 respectively include five photoelectric conversion elements 184-1~184-5 and five photoelectric conversion elements 185-1~185-5, as shown in FIG. 20. In this structure, the photoelectric conversion elements 184-1~184-5 respectively correspond to five split pupils (also referred to as pupil portions) 186-1~186-5 at the exit pupil of the image forming optical system, and likewise, the photoelectric conversion elements 185-1~185-5 respectively correspond to split pupils 186-1~186-5. In order for one set of four pixels to overlap the other set of four pixels when the photoelectric conversion elements 184-1~184-5 and the photoelectric conversion elements 185-1~185-5 are utilized, the images formed on the focal point detection plane with a light flux having passed through a single pupil portion and having then entered the micro-lenses 182 and 183 must be offset from each other by one pixel, as shown in FIG. 20.

In a focal point detection device adopting the so-called TCL method in the related art, with micro-lens surfaces set at the predetermined focal plane of the image forming optical system, the plane of the micro-lens surfaces match the focal point detection plane and thus, the sampling pitch with which focal point detection images are sampled is determined in conformance to the pitch with which the micro-lenses are disposed. While the TCL method requires the micro-lenses to be set next to one another with a fine pitch in order to improve the detection accuracy, micro-lenses arrayed with such a fine pitch need to be small, which results in less light passing through the micro-lenses and ultimately a lower level of detection performance. Accordingly, the focal point detection device in the embodiment of the present invention is designed to ensure that a specific positional relationship along the optical axis be achieved with regard to the predetermined focal plane (focal point detection plane) 181, the micro-lens arrays 182 and 183 and the photoelectric conversion element arrays 184 and 185, so as to set a sampling pitch at the focal point detection plane smaller than the pitch between the micro-lens of each micro-lens array.

Namely, with Pd representing the pitch of reverse-projected element images on the predetermined focal plane, i.e., the sampling pitch, and P representing the pitch with which the micro-lenses are disposed, a condition expressed as P/Pd>1 is satisfied in the focal point detection device in the embodiment designed as above explained. For instance, P/Pd may be equal to or greater than 1.1, and more desirably P/Pd may be equal to or greater than 1.5 or more. In the example presented in FIG. 21, P/Pd=2 with the photoelectric conversion element arrays each constituted with ten photoelectric conversion elements, set so as to allow eight pixels corresponding to one array to overlap eight pixels corresponding to the other photoelectric conversion element array and the two sets of pixels offset relative to each other by two pixels.

It is generally known that better accuracy is achieved in focal point detection executed with light fluxes passing through pupil portions set apart from each other over a greater distance. This means that the detection accuracy achieved by adopting a structure such as that shown in FIG. 19, which includes only two micro-lenses 182 and 183 disposed next to each other and the corresponding two photoelectric conversion element arrays 184 and 185, is very limited. Accordingly, a structure such as that shown in FIG. 22, in which light fluxes having entered a plurality of micro-lenses 187-1~187-5 are received at an equal number of photoelectric conversion element arrays 188-1~188-5, is adopted.

Figure 22:
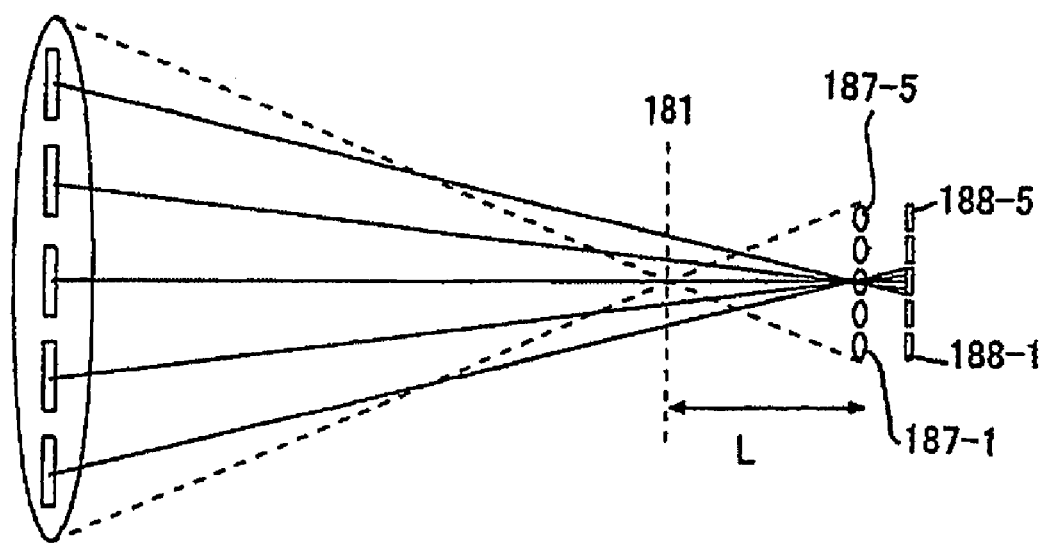

As shown in FIG. 22, light having passed through a given point on the focal point detection plane 181 enters the five micro-lenses 187-1~187-5. Since the incident light widens over the range indicated by the dotted lines, the light having passed through the given point on the focal point detection plane 181 is then allowed to enter all the micro-lenses in FIG. 22. The extent of image shift can then be determined through arithmetic operation executed based upon the signal outputs from the plurality of photoelectric conversion element arrays 188-1~188-5 respectively corresponding to these micro-lenses 187-1~187-5. In addition, if this structure is adopted in a focal point detection device, the defocus quantity can be calculated based upon the signal outputs.

Figure 19:
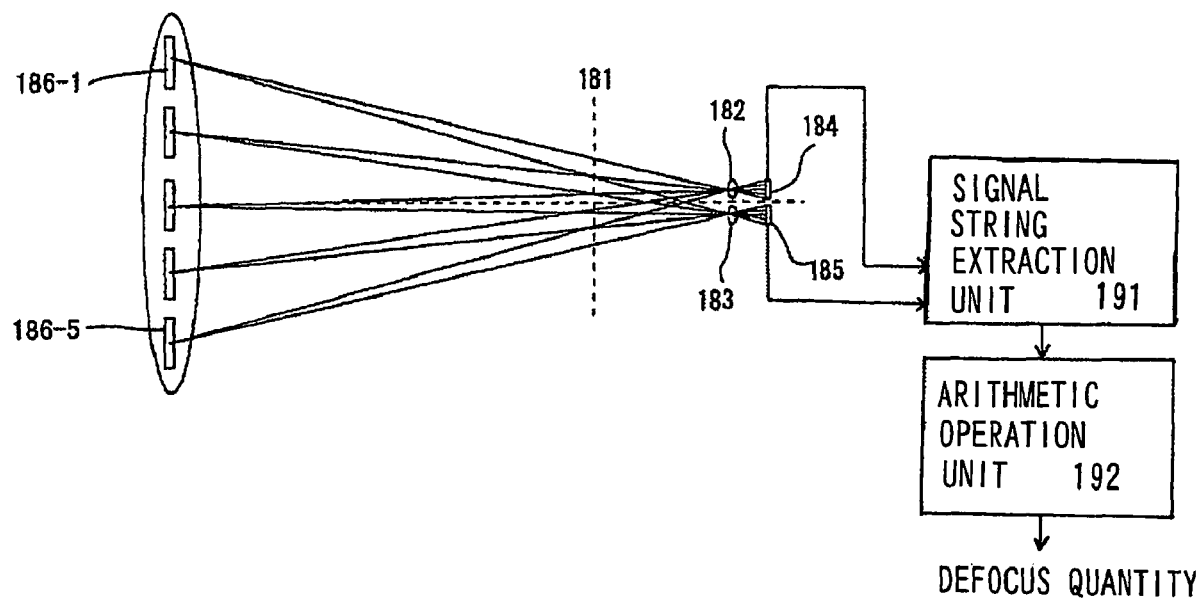
FIG. 19
An illustration of the optical system in the image forming state detection device according to the present invention, provided to facilitate an explanation of the principle adopted in the image forming state detection device FIG. 20
An illustration of a reverse-projected image in the image forming state detection device according to the present invention, provided to facilitate an explanation of the principle adopted in the image forming state detection device

While an explanation has been given in reference to FIGS. 19 and 20 by assuming that there are five pupil portions, five is the absolute minimum number of pupil portions that need to be present at the exit pupil. It is desirable to ensure that there are at least six pupil portions and even more desirable to have eight or more pupil portions in practical applications. The example presented in FIG. 8 to be detailed later assumes twelve pupil portions in conjunction with a photographic lens with an F value of 4. In conjunction with a photographic lens with an F value of 8, six pupil portions are assumed, as shown in FIG. 9.

Figure 8:
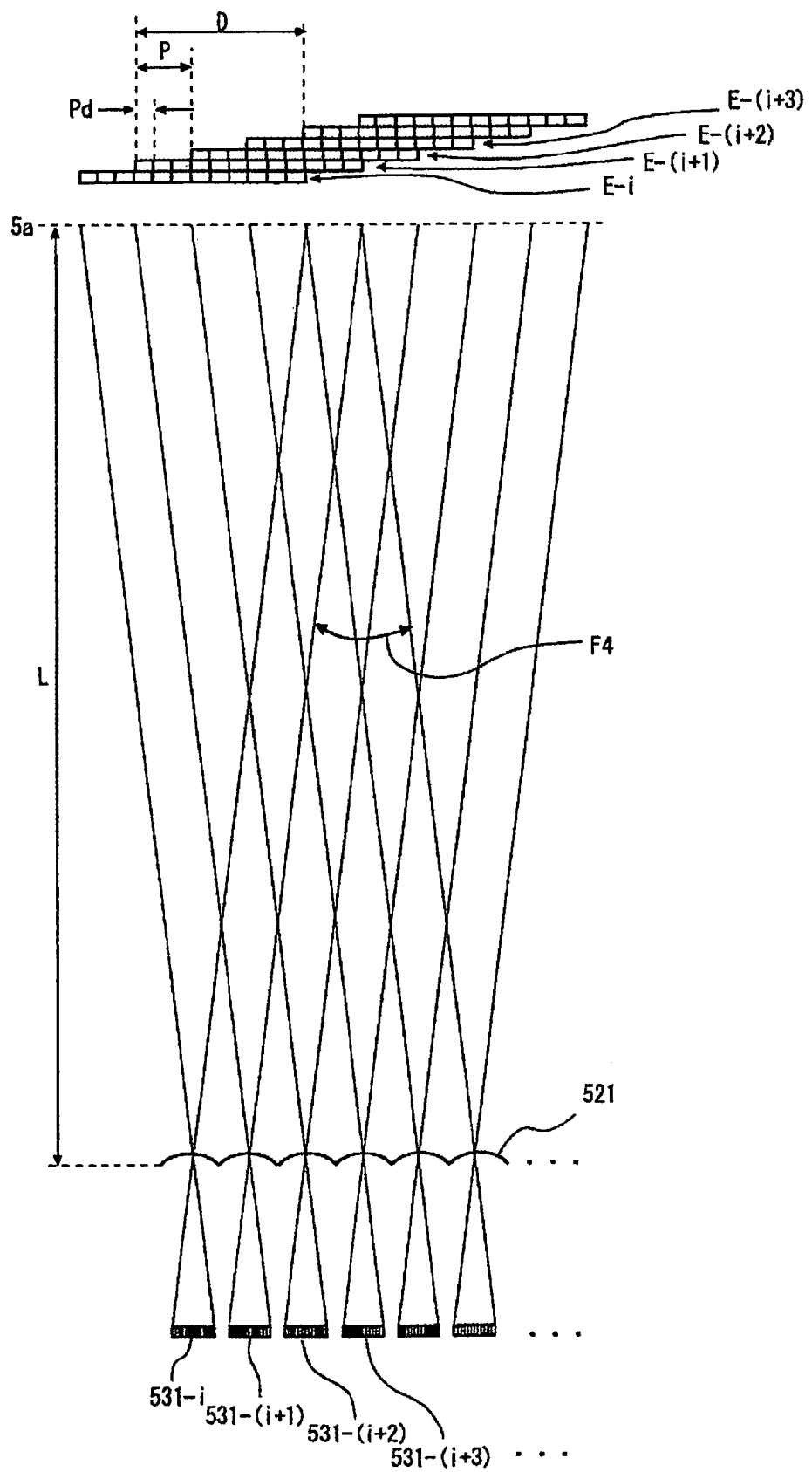
FIG. 8
A specific example of the focal point detection unit 5 (when the F value of the photographic lens 100 is "4")
Figure 9:
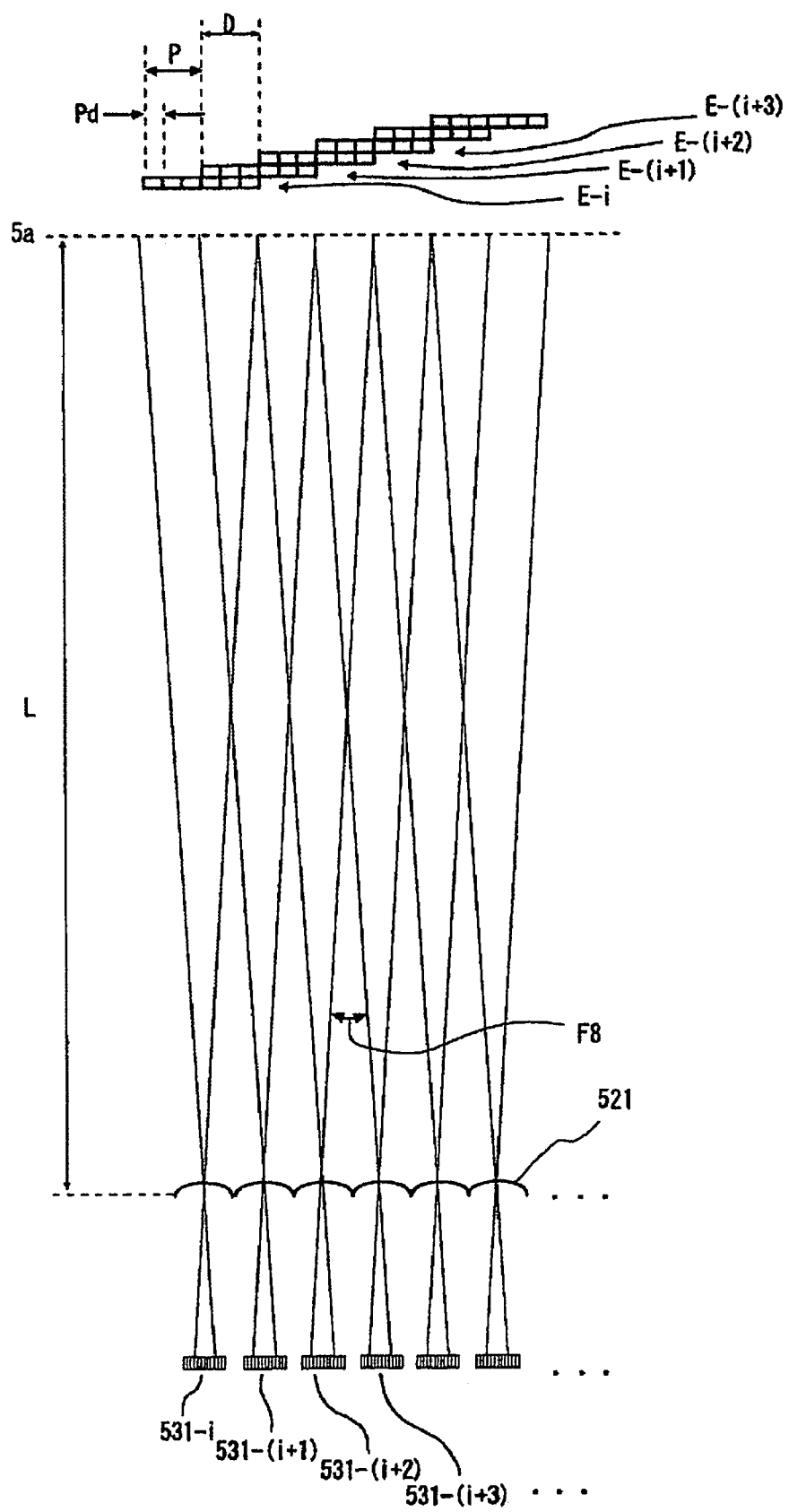
FIG. 9
A specific example of the focal point detection unit 5 (when the F value of the photographic lens 100 is "8")

It is to be noted that while the number of pupil portions is set to the values quoted above in the examples presented in FIGS. 8 and 9 so as to simplify the illustrations therein, the present invention is not limited to these examples.

Assuming that light fluxes having traveled through pupil portions the diameter of which is indicated as Fp (equivalent to an F value), enter (geometrically) the light-receiving portions under the micro-lenses over the range matching the pitch with which the light-receiving portions are disposed and that P and L respectively represent the pitch between the micro-lens of each micro-lens array and the distance between the micro-lens arrays and the predetermined focal plane, the sampling pitch Pd at the focal point detection plane is expressed as Pd=L/Fp. Accordingly, a condition expressed as P>L/Fp must be achieved to ensure that the sampling pitch Pd is smaller than the pitch P (P>Pd) between the micro-lens. In other words, L<P×Fp must be true for the distance L between the micro-lens arrays and the predetermined focal plane.

In addition, since (Q−4)×L/Fp≧P must be true to allow the images of the light-receiving portions at the focal point detection plane (reverse-projected images) to overlap over at least a four-pixel range required for a successful correlation operation with Q (≧5) representing the number of split pupils present at the exit pupil, L≧P×Fp/(Q−4) must be true with regard to the distance L.

First Embodiment

Next, the first embodiment of the present invention is explained in reference to FIGS. 1~11 and 23~27. The first embodiment provides an electronic camera system equipped with the image forming state detection device (e.g., a focal point detection device) achieved in an embodiment of the present invention. The structure of the electronic camera system is first explained.

FIG. 1 shows the structure adopted in the electronic camera system in the embodiment. As shown in FIG. 1, the electronic camera system includes a camera body 200 and a photographic lens 100 that can be detachably mounted at the camera body 200. The camera body 200 and the photographic lens 100 are connected with each other via a coupling portion 10 through which signals are connected or a drive force is transmitted.

A lens group 1 that forms an image with a light flux originating from the subject (subject light flux), an aperture 2, a drive mechanism 3 and the like are disposed inside the photographic lens 100. A quick-return mirror 13 is disposed inside the camera body 200 on the optical axis of the photographic lens 100.

A shutter 11 and an imaging element 12 are disposed in this order on the transmission side of the quick-return mirror 13 whereas a pentaprism 6 and an eyepiece lens 15 constituting an optical viewfinder are disposed in this order on the reflection side of the quick-return mirror 13 inside the camera body 200.

A sub-mirror 14 is disposed between the quick-return mirror 13 and the shutter 11 with a focal point detection unit 5 disposed on the reflection side of the sub-mirror 14. It is to be noted that the present invention may also be adopted in a camera system that uses silver halide film instead of the imaging element 12.

Various operation buttons 16 are disposed at the camera body 200. The operator is able to issue a focal point adjustment instruction and a photographing instruction for the electronic camera system, specify the F value of the photographic lens 100 and the like via the operation buttons 16.

As a focal point adjustment instruction is input, a microprocessor 9 in the camera body 200 executes focal point detection by driving the focal point detection unit 5. At this time, the focal point detection unit 5 obtains a signal containing information indicating the defocus quantity, i.e., the extent of defocusing manifested by the photographic lens 100, based upon at least part of the subject light flux having passed through the photographic lens 100 and provides the signal thus obtained to the microprocessor 9. The focal point detection unit 5 is to be described in detail later. The microprocessor 9 generates a defocus signal based upon the signal provided from the focal point detection unit 5 and outputs the defocus signal to the drive mechanism 3 within the photographic lens 100. The drive mechanism 3, in turn, executes focal point adjustment by displacing a specific lens group inside the photographic lens 100 based upon the defocus signal.

As a photographing instruction is input, the microprocessor 9 drives the quick-return mirror 13, the shutter 11 and the aperture 2 so as to obtain image data by exposing the imaging element 12 with the subject light flux from the photographic lens 100 at an aperture value and shutter speed matching the photographing conditions. The aperture 2 is driven via the drive mechanism 3.

Next, the structure adopted in the focal point detection unit 5 is explained in detail.

Figure 2:
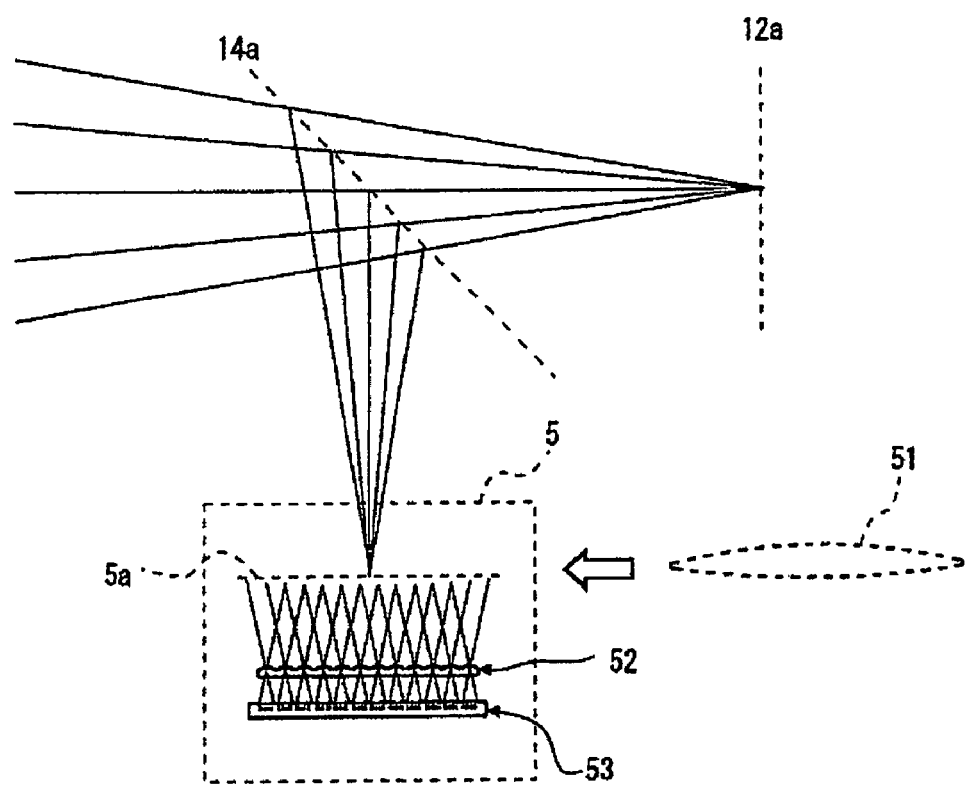

FIG. 2 presents a diagram of the optical path in the focal point detection unit 5 and the area around the focal point detection unit. Reference numeral 14a, reference numeral 12a and reference numeral 5a in FIG. 2 respectively indicate the reflecting surface of the sub-mirror 14, the imaging surface over which an image is captured by the imaging element 12 and the predetermined focal plane, which is optically equivalent to the imaging surface 12a relative to the reflecting surface 14a. An image is formed with the subject light flux from the photographic lens 100 in the vicinity of the predetermined focal plane 5a. The predetermined focal plane 5a is the focal point detection plane of the focal point detection unit 5.

As shown in FIG. 2, a micro-lens array 52 is disposed on a plane set apart from the predetermined focal plane 5a by a specific distance and a line sensor array 53 is disposed further rearward relative to the micro-lens array to receive light having passed through the micro-lenses in the focal point detection unit 5.

If light beams over an area with a significant image height are to be utilized for focal point detection, a field lens 51 may be inserted in the optical path (between an area near the predetermined focal plane 5a and the micro-lenses) so as to bend the light beams over the area with the significant image height along the optical axis. However, the following explanation is provided by disregarding the presence of such a field lens 51.

Figure 3:
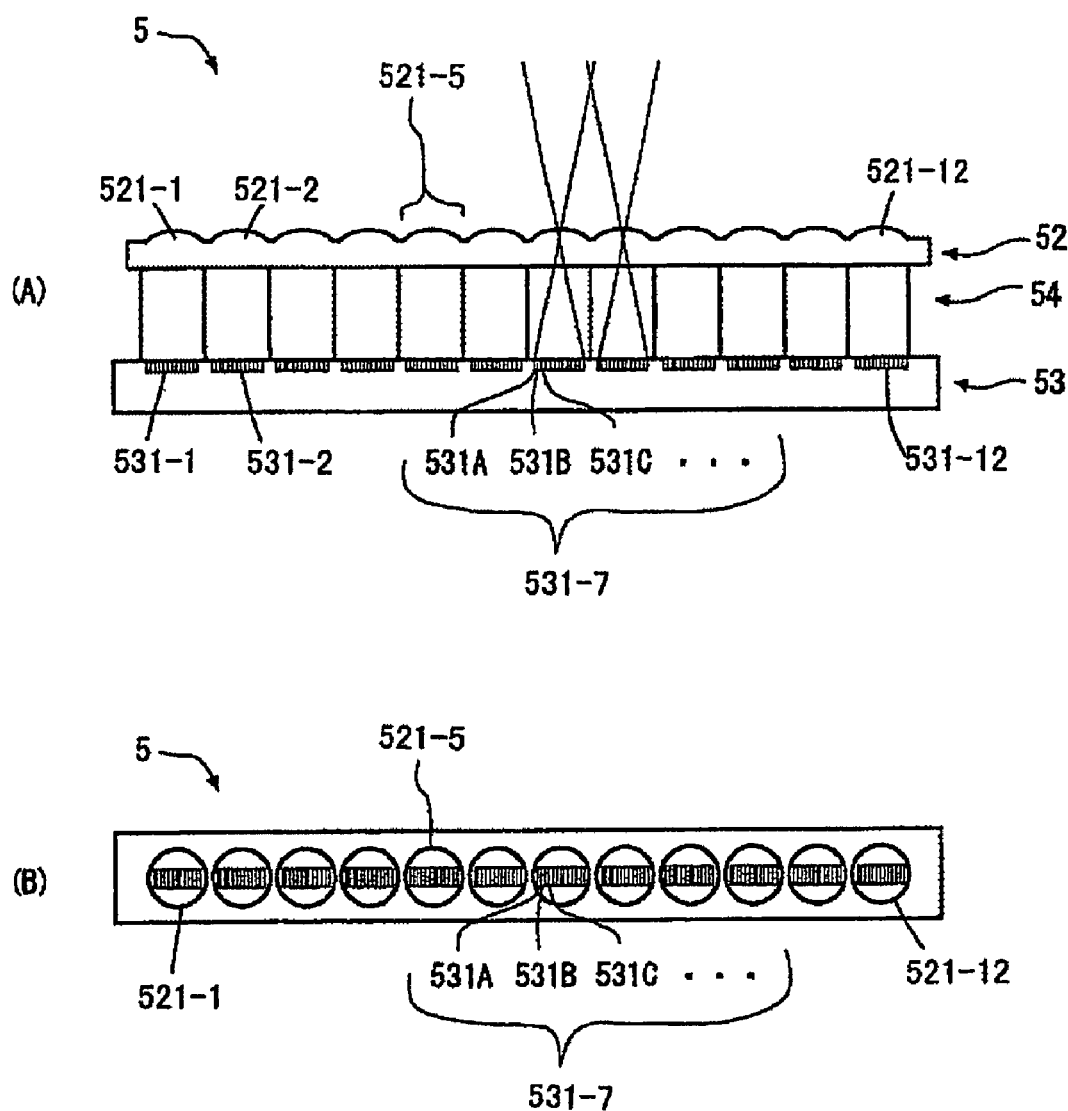
FIG. 3
An enlarged view of the focal point detection unit 5

FIG. 3 shows the focal point detection unit 5 in enlarged views. FIG. 3(A) presents a schematic sectional view of the focal point detection unit 5 taken along a plane containing the optical axis, whereas FIG. 3(B) presents a schematic front view of the micro-lens array 52 and the line sensor array 53, shown one on top of the other.

As shown in FIGS. 3(A) and 3(B), a plurality of micro-lenses 521-1~521-12 with positive power are disposed with a predetermined pitch along a specific direction (along the lateral direction in the figures) in the micro-lens array 52. The line sensor array 53 is constituted with line sensors 531-1~531-12 respectively corresponding to the micro-lenses 521-1~521-12, and the numbers of photoelectric conversion elements included in each of the line sensors 531-1~531-12 are equal to one another.

The focal point detection unit 5 is designed so that as reverse-projected images of the line sensors 531-1~531-12 are formed on the predetermined focal plane 5a shown in FIG. 2 via the micro-lens array 52, at least the reverse-projected images of each pair of adjacent line sensors at least partially overlap, as explained in detail later in reference to FIGS. 4 and 5. Photoelectric conversion elements 531A, 531B, . . . , in each line sensor 531 are disposed side-by-side along a direction matching the direction in which the micro-lenses 521-1~521-12 and the line sensors 531-1~531-12 are disposed (along the lateral direction in the figures). While twelve line sensors 531-1~531-12 are shown in FIGS. 3(A) and 3(B), a single continuous line sensor with photoelectric conversion elements disposed over twelve ranges each corresponding to one of the twelve micro-lenses 521-1~521-12 may be utilized instead.

While the micro-lenses 521 in the micro-lens array 52 in FIG. 3(A) are plano-convex lenses, the micro-lens array may be constituted with biconvex lenses instead.

Light shielding walls such as those indicated by reference numeral 54 in FIG. 3(A) may be formed in the focal point detection unit 5 in order to prevent cross talk (entry of leaked light) between adjacent micro-lenses 521.

Instead of the light shielding walls 54, an aperture may be formed. Such an aperture should assume an opening pattern that includes a plurality of circular openings set with a pattern identical to the pattern with which the micro-lenses 521 are arrayed. As a further alternative, instead of disposing an aperture between the micro-lens array 52 and the line sensor array 53, an aperture may be disposed in the photographic lens 100, at the reflecting surface of the quick-return mirror 13, at the reflecting surface of the sub-mirror 14 or the like. The following explanation is provided by disregarding the presence of the light shielding walls 54 or the aperture.

Figure 4:
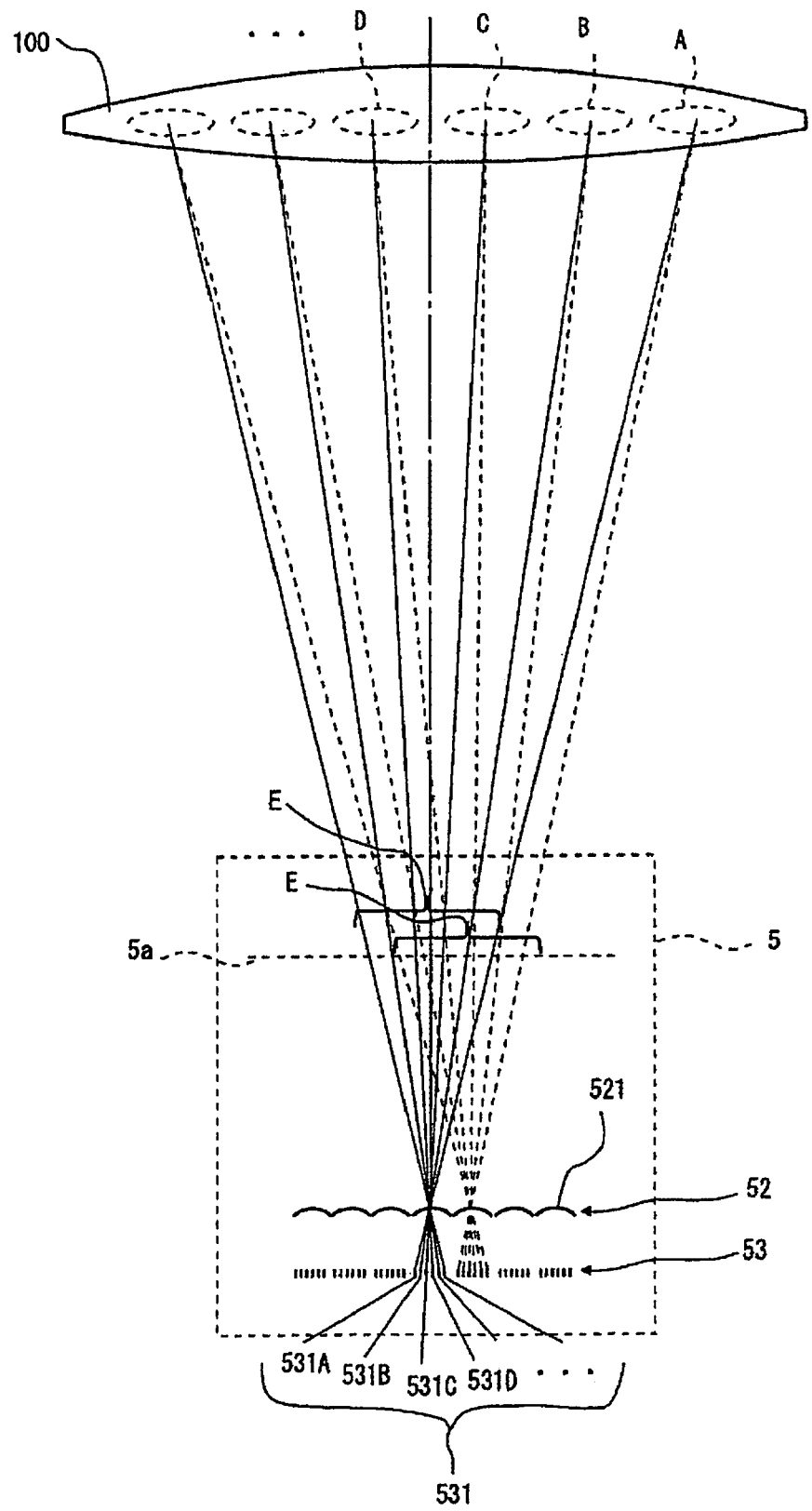
FIG. 4
The relationship between the individual line sensors 531 in the focal point detection unit 5 and the photographic lens 100

FIG. 4 illustrates the relationship between the individual line sensors 531 in the focal point detection unit 5 and the photographic lens 100. FIG. 4 is a conceptual diagram representing the photographic lens 100 as a single lens and showing the optical path from the photographic lens 100 to the focal point detection unit 5 as a straight-line without including an illustration of the sub-mirror 14 and the like.

As shown in FIG. 4, the photoelectric conversion elements 531A, 531B, 531C, 531D, . . . , in each line sensor 531 respectively receive light fluxes having passed through various pupil portions A, B, C, D, . . . , on the pupil of the photographic lens 100. The light fluxes are received at the individual photoelectric conversion elements in this manner at all the line sensors 531.

Then, the line sensors 531 each detect the brightness distribution pattern over a detection area E on the predetermined focal plane 5a, i.e., the brightness distribution pattern along the lateral direction in FIG. 4, via the corresponding micro-lens 521. The detection areas E corresponding to the individual line sensors 531 are offset from one another by a distance substantially equivalent to the pitch with which the micro-lenses 521 are disposed. In other words, a pair of detection areas corresponding to a pair of adjacent line sensors overlap. The detection areas E are now explained in further detail in reference to FIG. 5.

Figure 5:
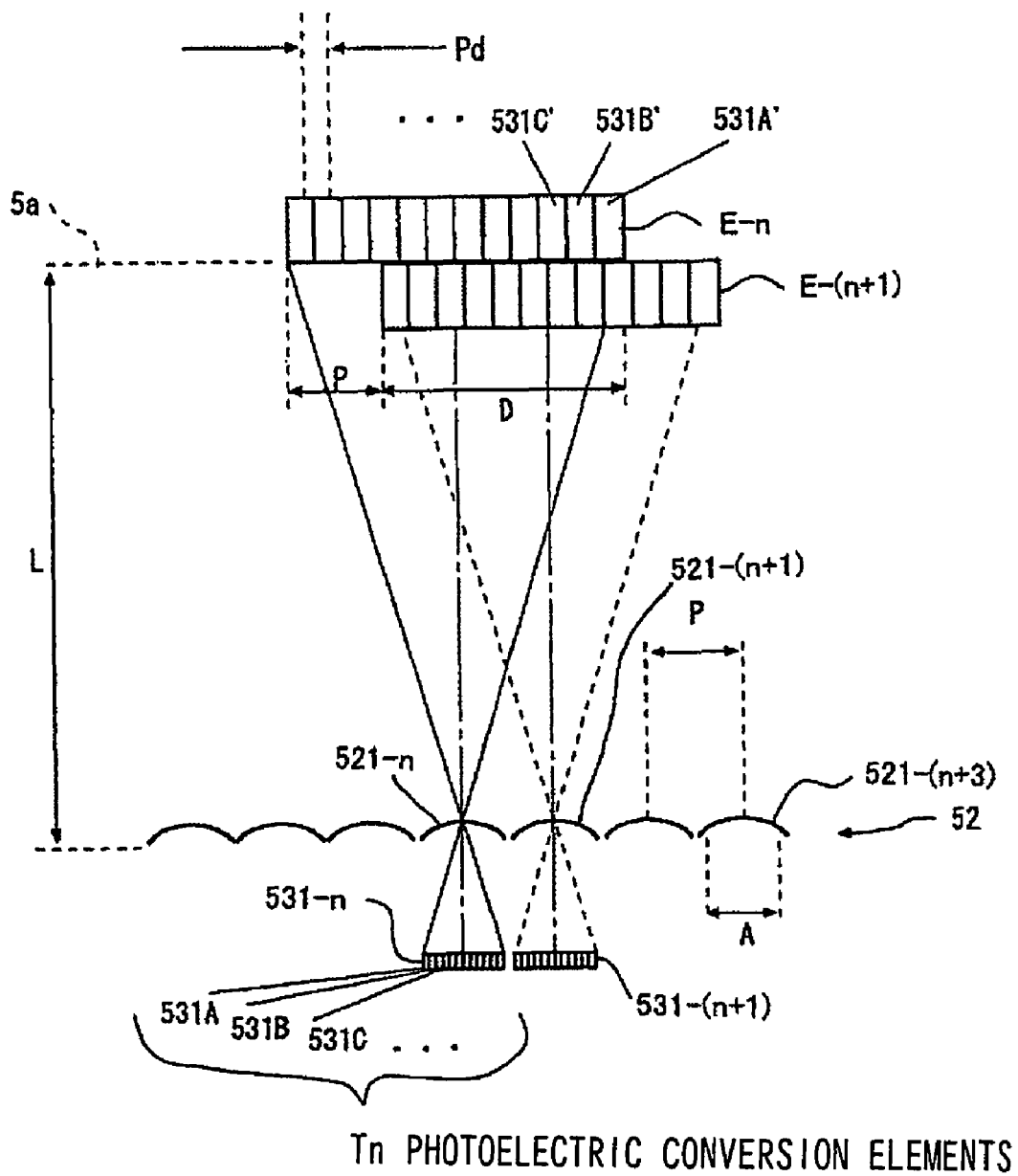
FIG. 5
The sizes of and the positional relationships among the components in the focal point detection unit 5

FIG. 5 shows the sizes of and the positional relationships among the primary components in the focal point detection unit 5. FIG. 5 shows two detection areas E-n and E-(n+1), which are adjacent to each other. These detection areas E correspond to the areas in which reverse-projected images are formed by reverse-projecting line sensors 531-$n$ and 531-($n$+1) corresponding to two adjacent micro-lenses 521-$n$ and 521-($n$+1) onto the predetermined focal plane 5a via the micro-lenses 521-$n$ and 521-($n$+1).

It is to be noted that in order to facilitate the explanation, FIG. 5 shows the two detection areas E offset from each other along the optical axis. Reference numerals 531A', 531B', 531C', . . . , inside the detection area E-n indicate the reverse-projected images formed by reverse-projecting the photoelectric conversion elements 531A, 531B, 531C, . . . , in the line sensor 531-$n$ onto the predetermined focal plane 5a via the corresponding micro-lens 521-$n$. The pitch Pd of the reverse-projected images 531A', 531B', 531C', . . . , is equivalent to the sampling pitch with which information is sampled on the predetermined focal plane 5a with the line sensors 531. Since the micro-lens array is disposed at a position distanced from the predetermined focal plane 5a and reverse-projected images of the photoelectric conversion elements 531A, 531B, 531C, . . . , are formed on the predetermined focal plane via the micro-lenses as described above, focal point detection information can be extracted with the pitch Pd finer than the pitch P with which the micro-lenses 521-1~521-12 are arrayed.

Next, the optical power of the micro-lenses 521, i.e., the image forming relationship (conjugate relationship) achieved between the predetermined focal plane 5 and the line sensors 531, is explained in detail.

Figure 6:
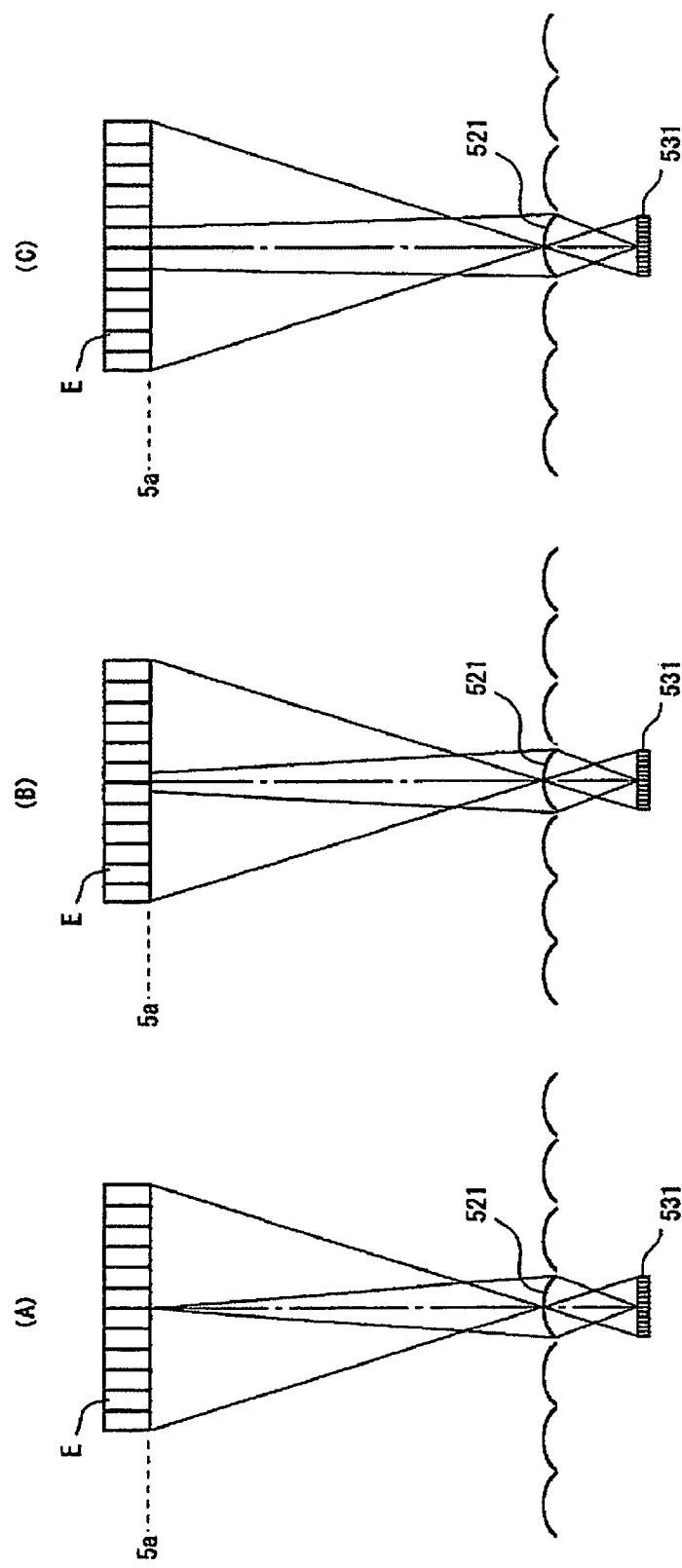
FIG. 6
The relationship (conjugate relationship) that may be observed with regard to the predetermined focal plane 5a and a line sensor 531 as an image is formed via the corresponding micro-lens 521

FIG. 6 shows image forming relationships (conjugate relationships) that may be observed between the predetermined focal plane 5a and a line sensor 531 as an image is formed via a micro-lens 521. It is not necessary for the focal point detection unit 5 according to the present invention to form an image of a given point on the predetermined focal plane 5a precisely onto a single point on the line sensor 531 with no blurring as shown in FIG. 6(A). Rather, it is more desirable to form a slightly blurred image, as shown in FIGS. 6(B) and 6(C). The following is an explanation of the extent of blurring optimal for the focal point detection unit 5.

FIG. 7 illustrates the extent of blurring optimal for the focal point detection unit 5. FIGS. 7(A) and 7(B) each show a signal output at a line sensor 531 when a point image of the subject is formed on the predetermined focal plane 5a. In FIG. 7(A), the extent of blurring is insufficient, whereas in FIG. 7(B) the extent of blurring is optimal.

When the extent of blurring is not sufficient, the point image is detected only at a single photoelectric conversion element, as shown in FIG. 7(A). This means that no change occurs in the output signal from the photoelectric conversion element if the position of the point image becomes offset by a slight extent (an extent equal to or less than the width of each pixel).

If, on the other hand, blurring occurs to an extent ranging over a plurality of pixels, as shown in FIG. 7(B), the point image is detected at a plurality of photoelectric conversion elements. Thus, even when the position of the point image becomes offset by a slight extent (an extent equal to or less than the width of each pixel), a change occurs in the output signal provided by the plurality of photoelectric conversion elements. In other words, a higher level of detection accuracy is achieved when the image is blurred to the optimal extent.

Based upon the rationale described above, the individual micro-lenses 521, the predetermined focal plane 5a and the line sensors 531 are offset by an optimal extent instead of achieving the exact conjugate relationship, so as to manifest the optimal extent of blurring in the focal point detection unit 5 according to the present invention.

It is to be noted that since blurring occurs in reality due to the diffraction at the micro-lenses 521 and the aberration (spherical aberration) of the micro-lenses 521 as well, the individual components are designed so as to achieve the optimal extent of blurring by taking into consideration all these factors.

Next, specific examples of the focal point detection unit 5 are explained.

FIG. 8 presents a specific example of the focal point detection unit 5 that may be utilized in conjunction with the photographic lens 100 assuming a detection F value (normally an open F value) of "4". It is to be noted that each pair of a line sensor 531 among the plurality of line sensors 531 and the corresponding detection area E among the plurality of detection areas E is assigned with a common identification number i, (i+1), (i+2), (i+3), . . . , in FIG. 8.

The design value selected for the various components constituting the focal point detection unit 5 are as follows.

Diameter (effective diameter) A of the micro-lenses 521: 50 μm

Pitch P with which the micro-lenses 521 are disposed: 75 μm

Distance L from the predetermined focal plane 5a to the micro-lens array 52: 1200 μm Number Tn of photoelectric conversion elements disposed in each line sensor 531: 12

Pitch Pd of photoelectric conversion element image pixels: 25 μm

In FIG. 8, the offset quantity, i.e., the extent by which detection areas E-i and E-(i+1) adjacent to each other are offset, is indicated as P. This offset quantity matches the pitch with which the micro-lenses 521 are disposed next to each other. Three reverse-projected photoelectric conversion element images are present within the range P in the focal point detection unit 5. In other words, focal point detection signals are obtained with a pitch that is ⅓ of the pitch with which the micro-lenses are disposed (i.e., with tripled resolution).

In addition, nine photoelectric conversion element images are present within the range D over which the adjacent detection areas E-i and E-(i+1) overlap. Thus, the extent of image shift can be calculated with the line sensors 531-i and 531-(i+1) adjacent to each other through a first sampling method to be detailed later by using pixels overlapping each other on the predetermined focal plane 5a over up to the 9-pixel range.

Furthermore, up to 4 detection areas E-i, E-(i+1), E-(i+2) and E-(i+3) overlap one another on the predetermined focal plane 5a. Namely, when the F value is 4, a subject light flux having entered a given point on the predetermined focal plane 5a then enters four micro-lenses 521. Thus, by adopting the first sampling method to be detailed later, focal point detection calculation can be executed based upon signals provided by the four line sensors 531 corresponding to the four micro-lenses 521 in conjunction with the photographic lens 100 assuming an F value of 4.

Moreover, focal point detection can be executed based upon signals provided from line sensors corresponding to four or more micro-lenses by adopting a second sampling method to be detailed later.

Next, an explanation is given on how the focal point detection unit 5 in the camera is utilized in conjunction with another photographic lens 100 assuming an F value of "8" instead of "4".

FIG. 9 presents a specific example of the focal point detection unit 5 that may be utilized in conjunction with the photographic lens 100 assuming an F value of "8".

As shown in FIG. 9, when the photographic lens 100 assumes an F value of "8", six photoelectric conversion element images are formed within each detection area E. Namely, output signals from the six photoelectric conversion elements at the center among the twelve photoelectric conversion elements at each line sensor 531, are utilized.

In this case, three photoelectric conversion element images are present within the range D over which the adjacent detection areas E-i and E-(i+1) overlap. Thus, the line sensors 531-i and 531-(i+1) adjacent to each other overlap over a three-pixel range on the predetermined focal plane 5a. If focal point detection is executed by adopting the first sampling method to be detailed later under these circumstances, a sufficient level of accuracy may not be assured since the number of pixels in each line sensor for which correlation can be calculated is smaller than four. However, effective focal point detection calculation can be executed by adopting the second sampling method even in this case.

Next, methods that may be adopted by the microprocessor 9 shown in FIG. 1 to determine through arithmetic operation the extent of image shift based upon line sensor output signals output from the focal point detection unit 5 having been explained in reference to FIGS. 8 and 9 are explained. Different image shift calculation procedures are adopted (over different ranges) in conjunction with a photographic lens 100 assuming an F value of 4 and in conjunction with a photographic lens 100 assuming an F value of "8". Accordingly, these calculation procedures are explained individually.

Figure 10:
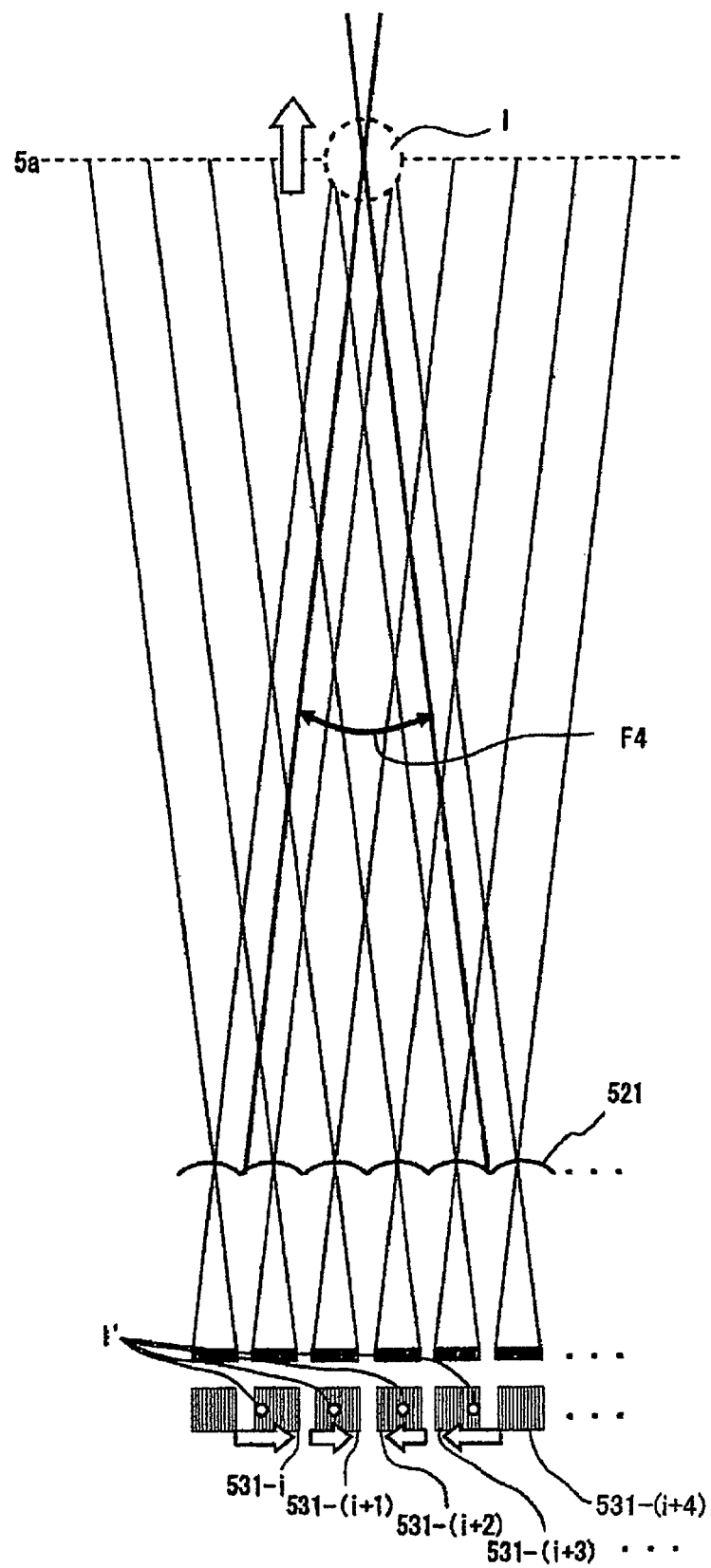
FIG. 10
An illustration provided to facilitate an explanation of how the defocus signal is generated when the F value of the photographic lens 100 is "4"

FIG. 10 shows how images on line sensors may become misaligned when the photographic lens 100 assumes an F value of "4".

As an image I of the subject is formed on the predetermined focal plane 5a via the photographic lens 100, secondary images I' of the image I are detected with the four line sensors 531-i, 531-(i+1), 531-(i+2) and 531-(i+3) adjacent to each other. As shown on the lower side of FIG. 10, the secondary images detected on the four line sensors 531-i, 531-(i+1), 531-(i+2) and 531-(i+3) are offset along the lateral direction by a specific extent. The extent of misalignment manifested along the lateral direction by the secondary images on a given two line sensors 531-i and 531-j among the four line sensors 531-i, 531-(i+1), 531-(i+2) and 531-(i+3) becomes greater when the two line sensors 531-i and 531-j are separated from each other by a greater distance.

When the image I of the subject is formed via the photographic lens 100 on a plane offset relative to the predetermined focal plane 5a along the direction indicated by the arrow on the top side of FIG. 10, too, secondary images of the image I are detected at the four line sensors 531-i, 531-(i+1), 531-(i+2) and 531-(i+3) adjacent to each other. In this case, the secondary images of the image I become offset from the image positions assumed when the image I is formed on the predetermined focal plane along the lateral direction, i.e., along the direction in which the elements are disposed, as indicated by the arrows on the bottom side of FIG. 10. The extent of this lateral offset corresponds to the extent of defocusing of the image I.

Under these circumstances, the defocus quantity indicating the extent of defocusing is determined through an arithmetic operation executed through the following procedure. When the F value is "4", the microprocessor 9 determines the extent of image shift by using an arithmetic operation algorithm to be detailed later in reference to FIG. 24 and then calculates the defocus quantity based upon output signals provided from a given pair of line sensors among the four line sensors 531-$i$, 531-($i$+1), 531-($i$+2) and 531-($i$+3) adjacent to each other.

For instance, the extent of lateral offset of the secondary images detected at the two outer line sensors 531-$i$ and 531-($i$+3) among the four line sensors 531-$i$, 531-($i$+1), 531-($i$+2) and 531-($i$+3) is most significant and, accordingly, the microprocessor 9 is able to calculate the defocus quantity with a high level of accuracy by using the output signals from these two line sensors 531-$i$ and 531-($i$+3).

However, if the extent of defocusing is large in the first place, the extent of the lateral offset of the secondary images detected at the two outer line sensors 531-$i$ and 531-($i$+3) may be too large. In such a case, it may not be possible to detect the extent of lateral offset of the secondary images based upon the output signals provided from the two outer line sensors 531-$i$ and 531-($i$+3). Accordingly, the microprocessor 9 may utilize the output signals from two adjacent line sensors 531-$i$ and 531-($i$+1), two adjacent line sensors 531-($i$+1) and 531-($i$+2) or two adjacent line sensors 531-($i$+2) and 531-($i$+3) to calculate the defocus quantity with a high level of reliability.

It is to be noted that the extent of lateral offset of the secondary images of a certain subject image may not be detected based upon the output signals from the four line sensors 531-$i$, 531-($i$+1), 531-($i$+2) and 531-($i$+3) disposed at specific positions. Even under such circumstances, the microprocessor 9 is able to calculate the defocus quantity with a high level of reliability by using output signals from four line sensors 531-$j$, 531-($j$+1), 531-($j$+2) and 531-($j$+3) disposed at different positions.

Figure 11:
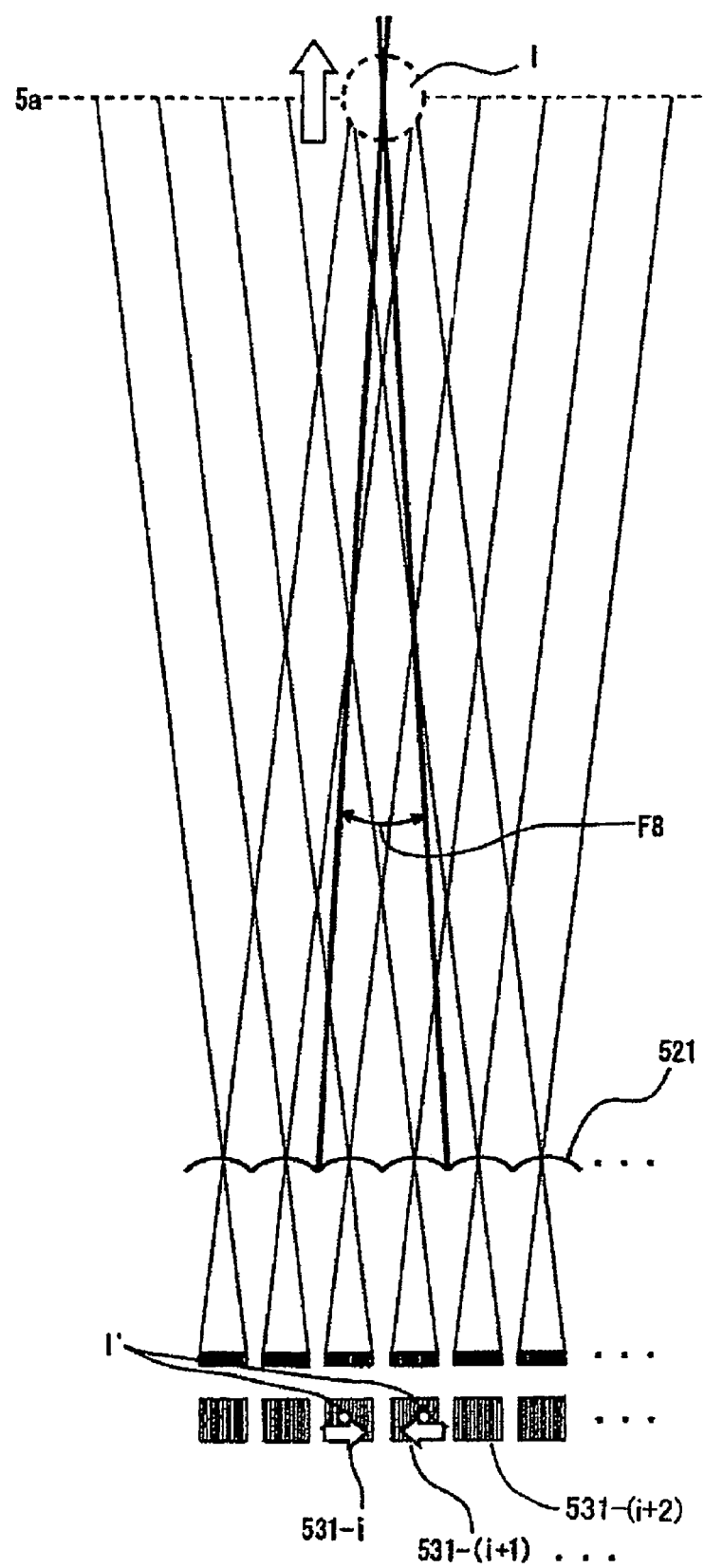
FIG. 11
An illustration provided to facilitate an explanation of how the defocus signal is generated when the F value of the photographic lens 100 is "8"

FIG. 11 shows the procedure through which the defocus quantity is calculated for the photographic lens 100 assuming an F value of "8". As an image I of the subject is formed on the predetermined focal plane 5$a$ via the photographic lens 100, secondary images I' of the image I are detected with the two line sensors 531-$i$ and 531-($i$+1) adjacent to each other.

When an image I of the subject is formed via the photographic lens 100 on a plane offset relative to the predetermined focal plane 5$a$, too, secondary images of the image I are detected at the two line sensors 531-$i$ and 531-($i$+1) adjacent to each other. In this case, the secondary images of the image I become offset from the image positions assumed when the image I is formed on the predetermined focal plane along the lateral direction, i.e., along the direction in which the elements are disposed, as indicated by the arrows on the bottom side of FIG. 11. The extent of this lateral offset corresponds to the extent of defocusing of the image I.

Figure 24:
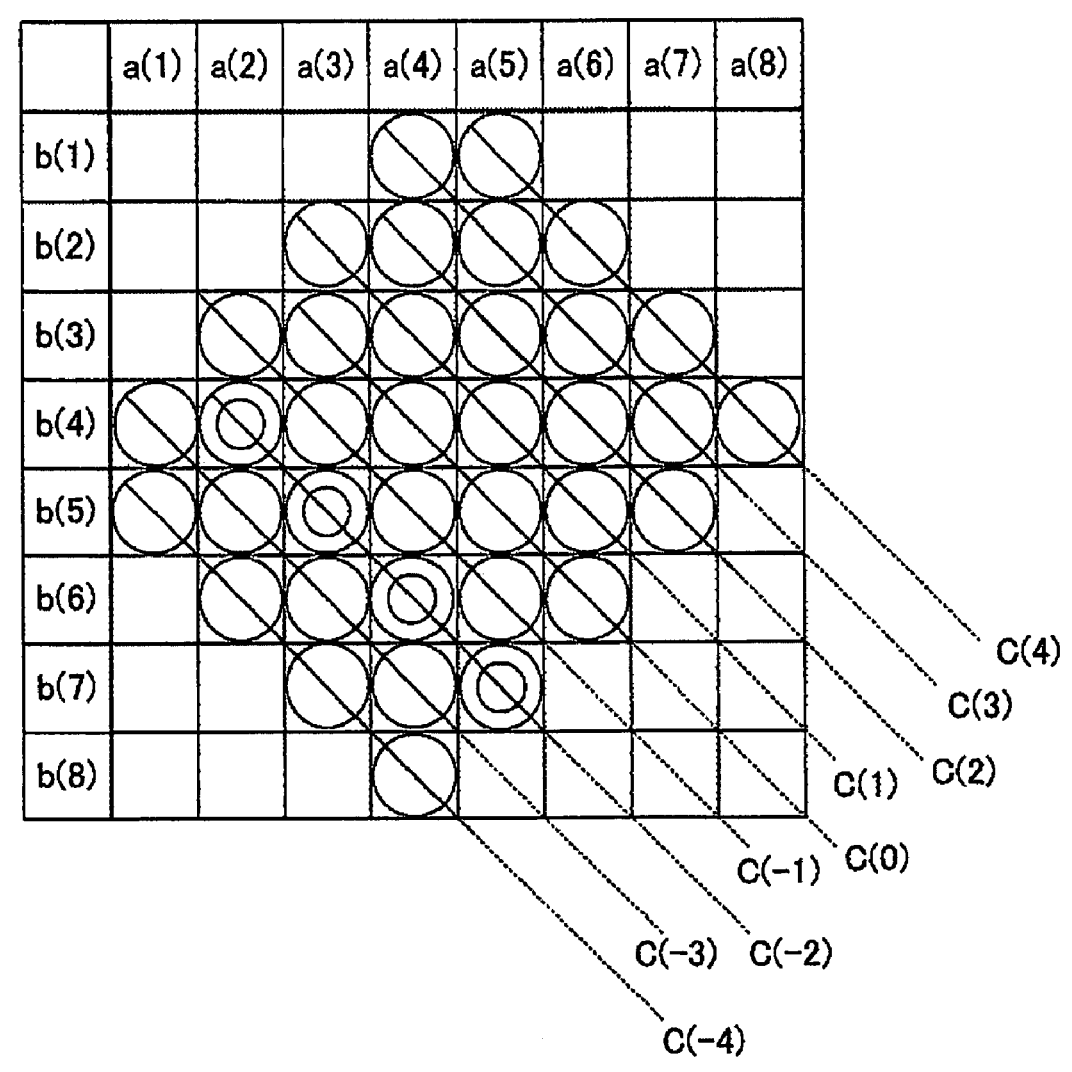

In this situation, the microprocessor 9 determines the extent of image shift through the arithmetic operation procedure to be explained later in reference to FIG. 24 and then calculates the defocus quantity, invariably based upon the output signals provided from the two adjacent line sensors 531-$i$ and 531-($i$+1), regardless of the extent of defocusing. It is to be noted that the extent of lateral offset of the secondary images of a certain subject image may not be detected based upon the output signals from the two line sensors 531-$i$ and 531-($i$+1) disposed at specific positions. Even under such circumstances, the microprocessor 9 is able to calculate the defocus quantity with a high level of reliability by using output signals from two line sensors 531-$j$ and 531-($j$+1) disposed at different positions. For instance, the microprocessor may use the output signals from the two line sensors 531-($i$+1) and 531-($i$+2) in FIG. 11.

Two different detection signal sampling methods that may be adopted in the focal point detection unit 5 structured as described above are now explained in reference to FIGS. 23 through 26.

—First Sampling Method—

The first sampling method allows a first signal string {a(i)} and a second signal string {b(i)} to be extracted with a pitch finer than the pitch P of the micro lenses 521. Namely, as shown in FIG. 23, a first signal string {a(i)}={a(1), a(2), ... a(8), ... } is formed with signals from the plurality of photoelectric conversion elements in the line sensor 531-1 corresponding to the micro lens 521-1 and a second signal string {b(i)}={b(1), b(2), ... b(8), ... } is formed with signals from the plurality of photoelectric conversion elements in the line sensor 531-2 corresponding to the micro lens 521-2.

Figure 23:
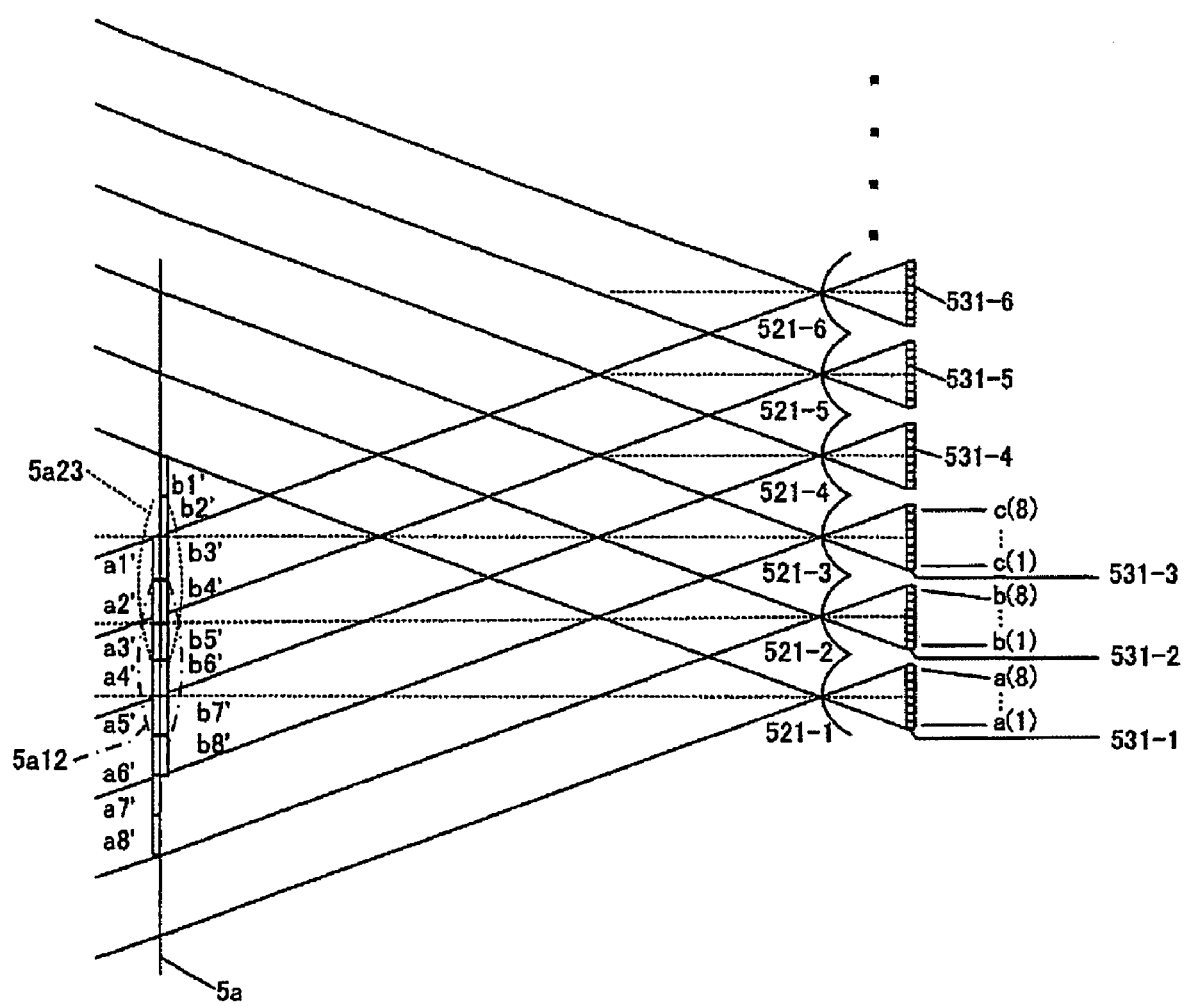

In FIG. 23, a1'~a8' indicate the reverse-projected images of the photoelectric conversion elements a1~a8 constituting the line sensor 531-1, formed on the focal point detection plane 5$a$. Likewise, b1'~b8' indicate reverse-projected images of the photoelectric conversion elements b1~b8 constituting the line sensor 531-2, formed on the focal point detection plane 5$a$. a1', a2', a3', a4' ... and the like respectively correspond to b3', b4', b5', b6' ... and the like on the predetermined focal plane. In other words, a(1), a(2), a(3), a(4) ... and the like in the first signal string {a(i)} respectively correspond to b(3), b(4), b(5), b(6) ... and the like in the second signal string {b(i)}. Thus, image present near a very small area 5$a$12 indicated by the one-point chain line on the focal point detection plane 5$a$ is detected. Image present over a very small area 5$a$23 next to the area 5$a$12, indicated by the dotted line, is likewise detected based upon the output signals from the line sensors 531-2 and 531-3. The pair of line sensors 531, the output signals from which are to be used for image detection, do not need to be adjacent line sensors 531, as long as the reverse-projected images of the line sensors overlap on the predetermined focal plane 5$a$. For instance, the line sensors 531-1 and 531-3 may be selected as the pair of line sensors, the output signals from which are to be used for image detection. Depending upon which specific line sensors 531 are selected for use, a different coefficient is applied when converting the image shift quantity to a defocus quantity.

—Second Sampling Method—

Figure 25:
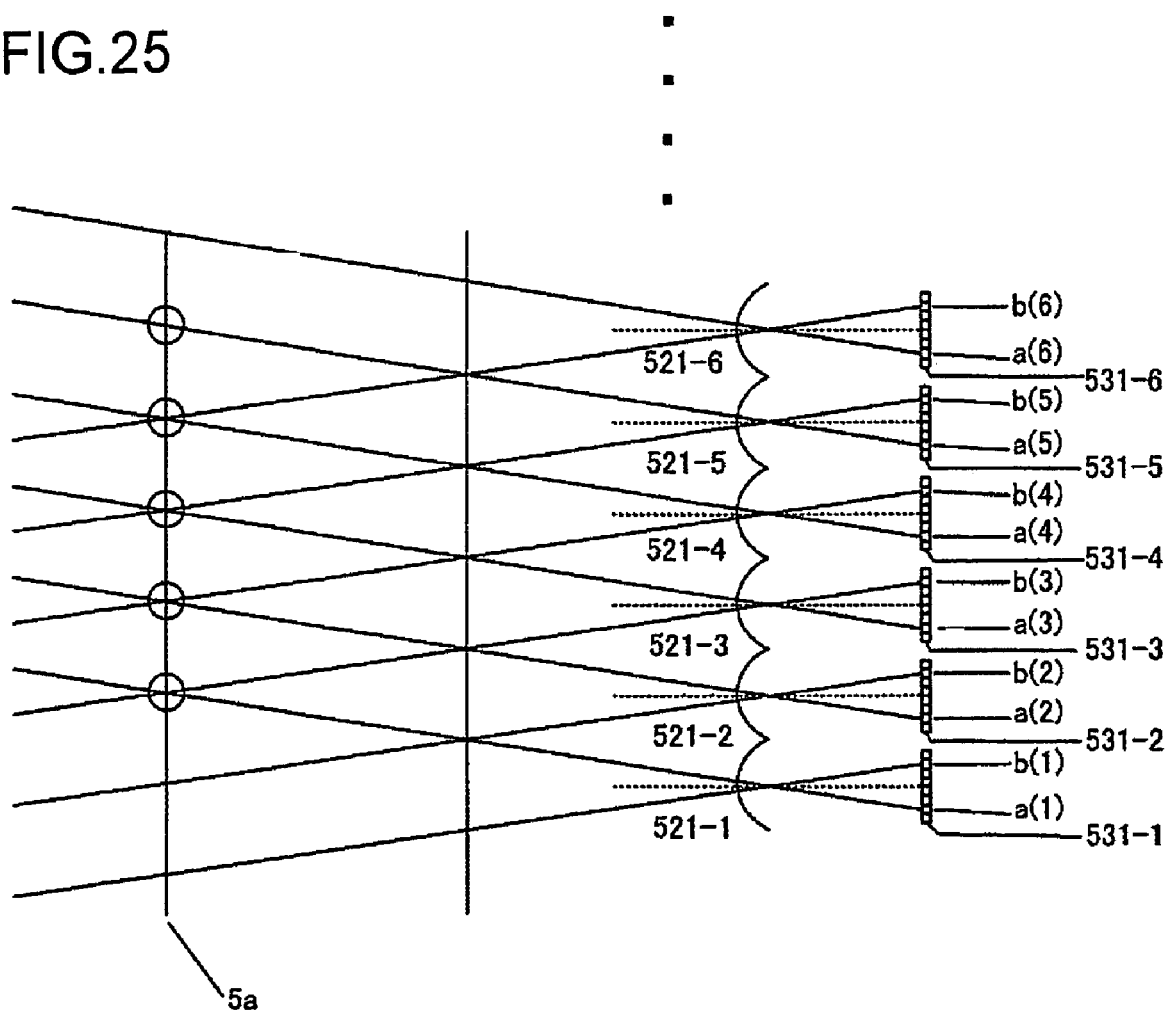

In the second sampling method, a first signal string {a(i)} and a second signal string {b(i)} are extracted by extracting as follows. A signal a(1) from the output signals of the plurality of photoelectric conversion elements constituting the line sensor 531-1 corresponding to the micro lens 521-1 and subsequently extracting signals a(2)~a(6), each corresponding to the signal a(1) from the output signals of the photoelectric conversion elements at the line sensors corresponding to the micro lenses 521-2~521-6 respectively, thereby forming the first signal string {a(i)}={a(1), a(2) ... a(6)}. The second signal string {b(i)}={b(1), b(2) ... b(6)} is likewise formed with output signals that have not been extracted to form the first signal string {a(i)} among the output signals from the photoelectric conversion elements constituting the line sensors 531-1~531-6. The correspondence between the first signal string {a(i)} and the second signal string {b(i)}, indicating a pair of signal outputs corresponding to a single image on the focal point detection plane 5$a$ in FIG. 25 is; a(1)=b(3), a(2)=b(4), a(3)=b(5), a(4)=b(6) ....

The first signal string {a(i)} and the second signal string {b(i)} may be selected in, for instance, one of the combinations shown in FIGS. 26(a) through 26(d). In the vicinity of the focus match point of a high-speed lens, a combination of signal strings such as that shown in FIG. 26(a), with a large detection opening angle assuring a high level of defocus detection accuracy, is effective. In addition, a combination of signal strings such as that shown in FIG. 26(d), with which a large misalignment quantity can be detected, is effective when the extent of defocusing is significant. The detection opening angle is determined in correspondence to a specific combination of signal strings that are selected and thus, the coefficient applied to convert the image shift quantity to a defocus quantity changes depending upon which signal strings are selected, i.e., which signal string combination among those shown in FIGS. 26(a) through 26(d) is selected.

The extent of offset manifested by the first signal string {a(i)} and the second signal string {b(i)} formed by adopting the first sampling method or the second sampling method is then calculated through a method in the known art explained below.

A correlation quantity C(N) indicating the level of correlation between the pair of images (signal strings) is calculated as expressed in (1) below in correspondence to a specific combination of the first signal string {a(i)} and the second signal string {b(i)} (i=1, 2, ...) shown in FIG. 24.

$$C(N) = \sum_{i=pL}^{i=qL} |a(i) - b(j)|; \quad j - i = N \quad (1)$$

In the expression provided above, N represents the number of shifts, qL represents the upper base of Σ and pL represents the lower base of the Σ. While four addends are added together in Σ in the example presented in FIG. 25, it should be ensured that there are at least four addends.

A shift quantity Na indicating the extent of shift is determined based upon the correlation quantity C(N) discretely calculated as indicated in (1). The shift quantity Na is calculated as expressed in (2) through (4) below, with C0 representing the correlation quantity which provides a minimal value when the number of shifts is N, Cr representing the correlation quantity when the number of shifts is (N−1) and Cf representing the correlation quantity when the number of shifts is (N+1).

$$DL = 0.5 \times (Cr - Cf) \quad (2)$$

$$E = MAX \{Cf - C0, Cr - C0\} \quad (3)$$

$$Na = N + DL/E \quad (4)$$

By adding a correction quantity Const corresponding to a specific position assumed on the focal point detection plane to the value calculated as indicated in expression (4), the image shift quantity Δn indicating the extent of image shift manifesting on the focal point detection plane is calculated as in (5) below.

$$\Delta n = Na + Const \quad (5)$$

Based upon the image shift quantity Δn, the defocus quantity Df is calculated as expressed in (6) below.

$$Df = Kf \times \Delta n \quad (6)$$

It is to be noted that Kf represents a constant which is determined in conformance to the detection opening angle.

Since Kf may be affected by Δn, it is more desirable to determine Kf (Δn) through testing.

Figure 27:
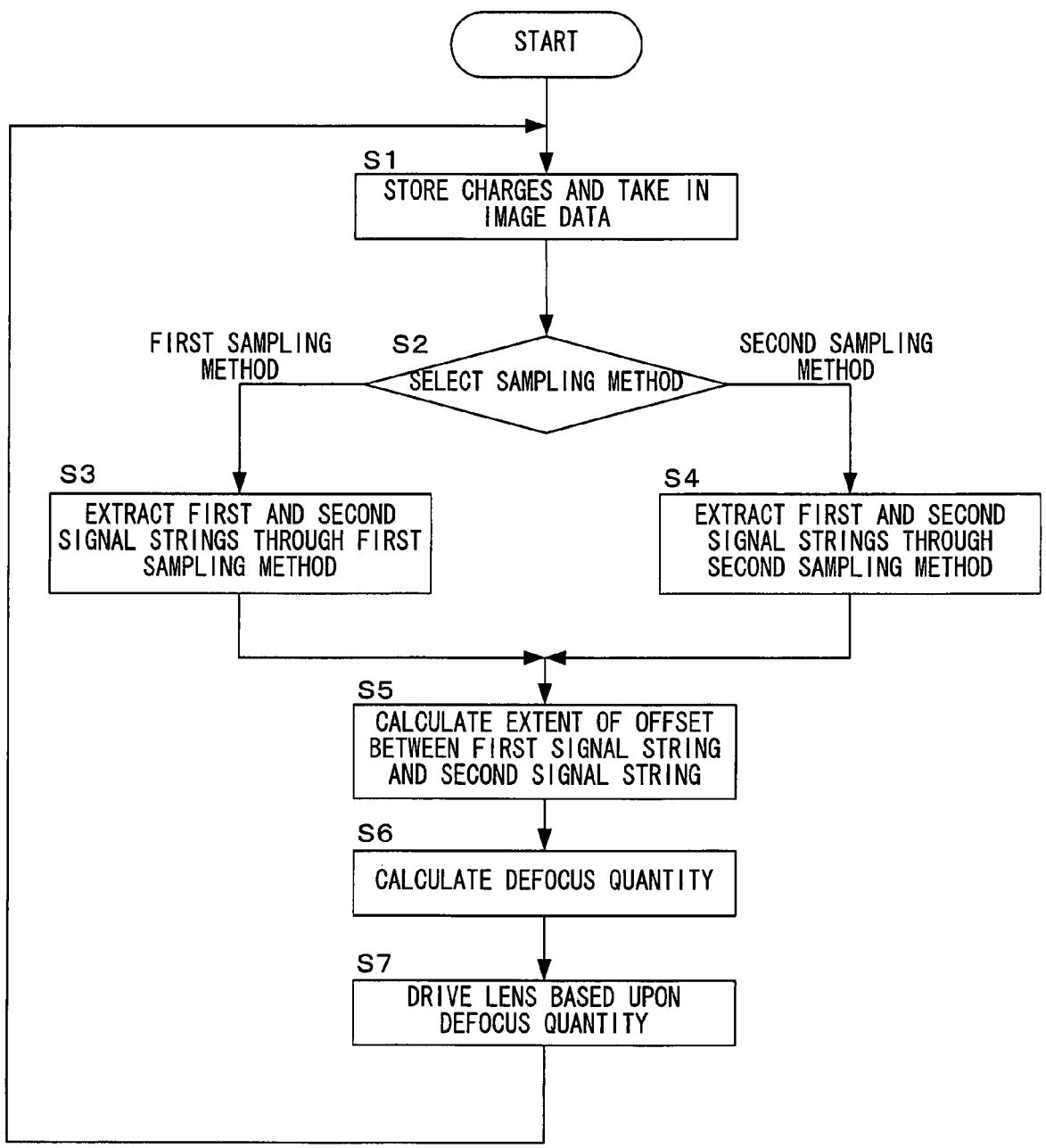

In reference to the flowchart presented in FIG. 27, an image shift detection operation executed at the focal point detection unit 5 is explained. It is to be noted that the various types of processing executed as indicated in the flowchart are executed by the microprocessor 9 in conformance to a specific program. In addition, the processing in the flowchart is started in response to an operation of an operation button 16.

In step S1, electrical charge storage starts at the line sensors 53, output signals (image data) provided from the individual elements at the line sensors 53 are taken in when a predetermined storage period elapses, before the operation proceeds to step S2.

In step S2, either the first sampling method or the second sampling method is selected based upon a decision-making criterion. If the first sampling method is selected, the operation proceeds to step S3, whereas if the second sampling method is selected, the operation proceeds to step S4. It is to be noted that the decision-making criterion may be, for instance, a defocus quantity-based criterion, according to which the second sampling method is selected if the defocus quantity exceeds a predetermined value and the first sampling method is selected if the defocus quantity is equal to or less than the predetermined value.

In step S3, the first signal string {a(i)} and the second signal string {b(i)} are extracted through the first sampling method as described earlier and then the operation proceeds to step S5. In step S4, the first signal string {a(i)} and the second signal string {b(i)} are extracted through the second sampling method as described earlier and then the operation proceeds to step S5. In step S5, the extent of offset manifested by the first signal string {a(i)} and the second signal string {b(i)} is calculated as explained earlier, before the operation proceeds to step S6.

In step S6, the defocus quantity is calculated as expressed in (6) and then the operation proceeds to step S7. In step S7, the defocus quantity having been calculated in step S6 is output to the drive mechanism 3 which then drives a specific lens group in the photographic lens 100 accordingly, before the operation returns to step S1.

It is to be noted that the processing procedure described above is executed on signals output from a plurality of line sensors 531 selected in correspondence to the F value assumed at the photographic lens 100.

The following advantages are achieved in the focal point detection unit 5 in the embodiment.

(1) The microprocessor 9 achieves better accuracy in focal point detection for a faster photographic lens 100 assuming a smaller F value.

(2) Numerous micro-lenses 521 and numerous line sensors 531 in the focal point detection unit 5 achieved in the embodiment are engaged in detection over detection areas E on the predetermined focal plane 5a offset from each other. Thus, even when a pitch P equal to the pitch Pd of the elements in the reverse-projected images in the split pupil image reforming method (see patent reference literature 1 and the like) in the related art is selected, the distance L between the predetermined focal plane 5a and the micro-lenses 521 can be reduced compared to the distance assumed in the split pupil image reforming method (see patent reference literature 1, for instance) in the related art. In other words, the focal point detection unit 5 in the embodiment can be easily provided as a more compact unit assuring a high level of detection accuracy.

(3) In the focal point detection unit 5 in the embodiment, the optical member at which the micro-lens array 52 is formed and the line sensor array 53 are disposed in close proximity to one another. As a result, highly accurate alignment of the micro-lens array and the line sensor array is facilitated. An advantage is thus achieved in that the occurrence of inconsistencies attributable to errors is reduced, assuring better accuracy in focal point detection.

(4) While the line sensor array 53 with a plurality of line sensors 531 disposed along the line direction is utilized in the focal point detection unit 5 in the embodiment, a single line sensor achieved by connecting the plurality of line sensors 531, instead of the line sensor array 53, may be utilized.

Variations of the First Embodiment

It is to be noted that the focal point detection unit 5 achieved in the embodiment allows for the following variations.

(1) An electronic camera system equipped with the focal point detection unit 5 described above is able to detect for itself the extent of displacement of an aperture-adjusted image plane, occurring as the aperture is adjusted at the photographic lens 100. Namely, the microprocessor 9 is able to determine the difference between the defocus quantity ascertained by using the outputs from the two outer line sensors 531-$i$ and 531-($i$+3) among the four line sensors 531-$i$, 531-($i$+1), 531-($i$+2) and 531-($i$+3) adjustment to each other in the focal point detection unit 5 and the defocus quantity ascertained based upon the outputs from the two adjacent lines sensors 531-($i$+1) and 531-($i$+2) at the center of the focal point detection unit 5. Then, based upon this difference, the microprocessor 9 is able to ascertain any change in the image plane that may have occurred as the aperture has been adjusted at the photographic lens 100. The term "aperture-adjusted image plane displacement" refers to the extent of offset of the focal plane of the photographic lens 100 that occurs when the F value is switched from "4" to "8". By using this information, the microprocessor 9 is able to execute focal point adjustment with an even higher level of accuracy.

(2) While the microprocessor 9 in the embodiment selects different line sensors 531 to be used as an output signal reference source in correspondence to the F value currently set for the photographic lens 100, line sensors 531 to be used as the output signal reference source may be adjusted in correspondence to the F value to be set for the photographic lens 100 (i.e., in correspondence to the control F value to be set for the exposure operation).

(3) The microprocessor 9 in the embodiment may alter the contents of the arithmetic operation executed to generate the defocus signal in correspondence to the F value currently set for the photographic lens 100 and/or the F value to be set for the photographic lens 100.

(4) It is desirable that the focal point detection unit 5 achieved in the first embodiment include optical systems each constituted with the micro-lens sensor array 52 and the line sensor array 53 disposed along two directions so as to improve the focal point detection accuracy. In other words, it may include a micro-lens array having a line sensor array set along a first direction and a micro-lens array having a line sensor array set along a second direction.

Figure 12:
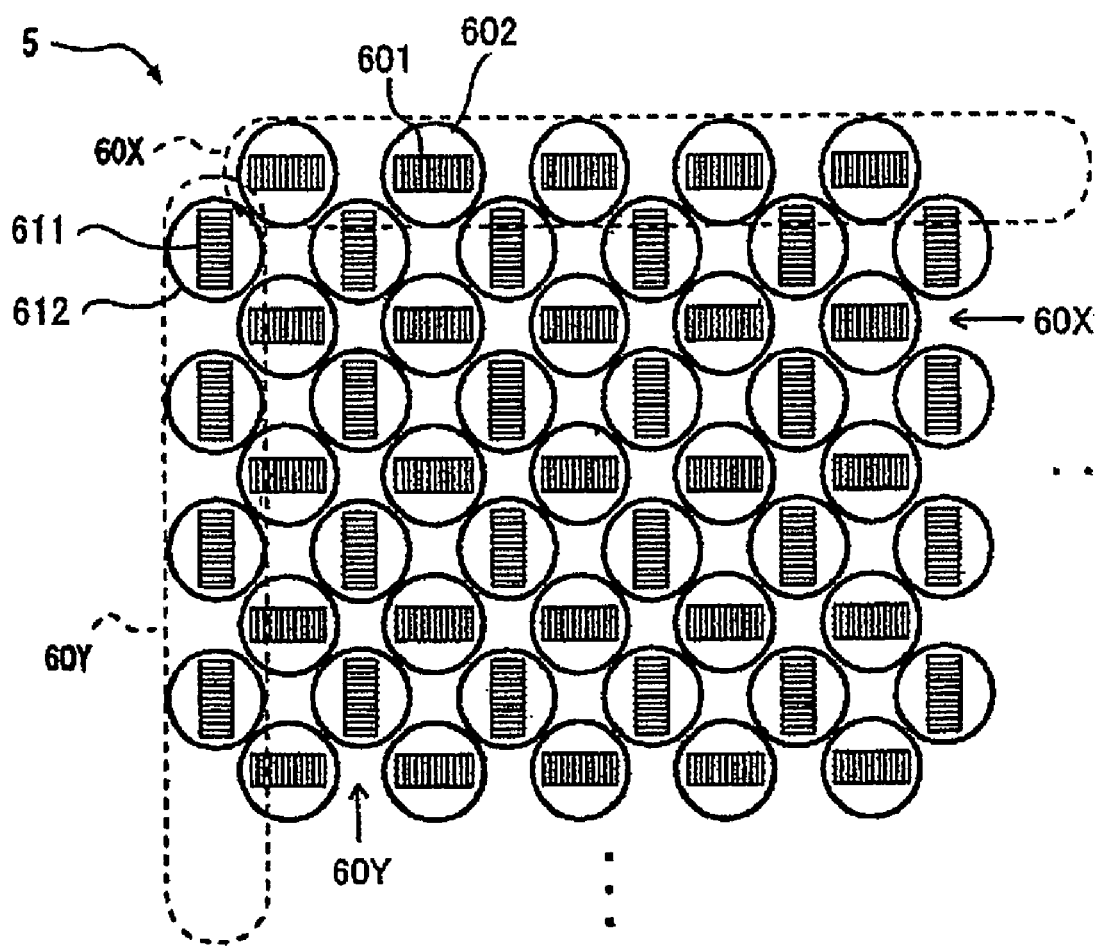
FIG. 12
An example of a variation of the focal point detection unit 5

FIG. 12 presents a front view of a variation of the focal point detection unit 5. This focal point detection unit 5 assumes a structure that includes a plurality of first optical systems 60X each constituted with a micro-lens array 52 and a line sensor array 53 disposed along the lateral direction and a plurality of second optical systems 60Y each constituted with a micro-lens array 52 and a line sensor array 53 disposed along the longitudinal direction.

Namely, the focal point detection unit 5 in FIG. 12 includes a plurality of first detection optical systems 60X each constituted with light-receiving portion groups 601, each of which, in turn, is made up with a plurality of photoelectric conversion elements (light-receiving portions) disposed along the first direction and micro-lenses 602 each disposed so as to guide a light flux to one of the light-receiving portion groups 601. It also includes a plurality of second detection optical systems 60Y each constituted with light-receiving portion groups 611, each of which is made up with a plurality of photoelectric conversion elements disposed along the second direction and micro-lenses 612 each disposed so as to guide a light flux to one of the light-receiving portion groups 611. The focal point detection unit assumes a structure achieved by disposing the plurality of first detection optical systems 60X and the plurality of second detection optical systems 60Y alternately so as to form a checkerboard pattern.

By disposing the two types of optical systems, i.e., the first optical systems 60X and the second optical systems 60Y, as described above, the pattern at each position that may be assumed on the predetermined focal plane 5$a$ can be detected along two directions, i.e., along the longitudinal direction and the lateral direction (crisscross detection)

In addition, with the plurality of first optical systems 60X and the plurality of second optical systems 60Y disposed with a high level of density, the density of detection areas set on the predetermined focal plane 5$a$, too, increases, which enables focal point detection to be executed for various areas of the subject.

In particular, by disposing the plurality of first optical systems 60X and the plurality of second optical systems 60Y alternately (in a checkerboard pattern), the crisscross detection mentioned earlier can be executed at various positions assumed on the predetermined focal plane 5$a$. Since high density detection over the predetermined focal plane is enabled, focal point detection can be executed successfully even if the subject moves slightly, assuring stable focal point detection.

Figure 13:
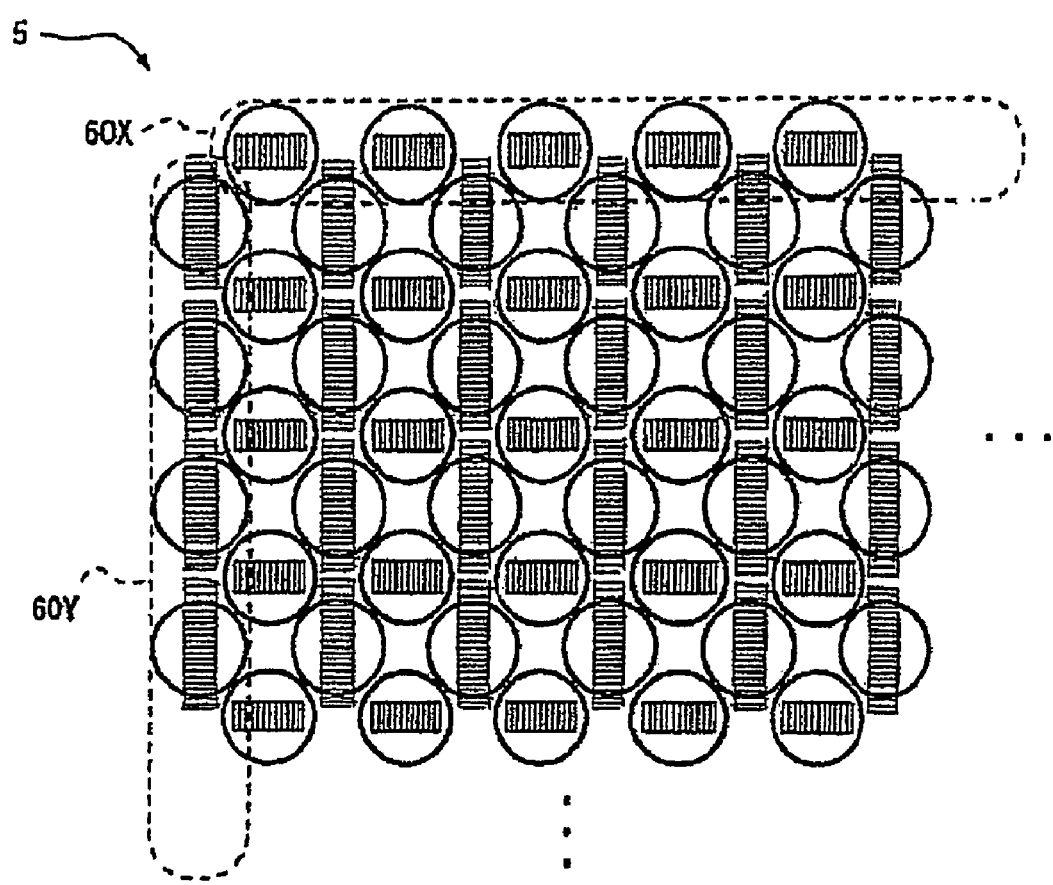
FIG. 13
Another example of a variation of the focal point detection unit 5

(5) The positional arrangement shown in FIG. 12 may be modified to that shown in FIG. 13. The focal point detection unit 5 in FIG. 13 includes second-direction line sensor arrays 53 ranging over a greater length than first-direction line sensor arrays 53. By increasing the length of the line sensors 53 disposed along a specific direction among the line sensors 53 disposed along the two different directions while ensuring that the two types of line sensors 53 do not interfere with each other, the detection performance for high-speed lenses assuming small F values can be improved.

Figure 14:
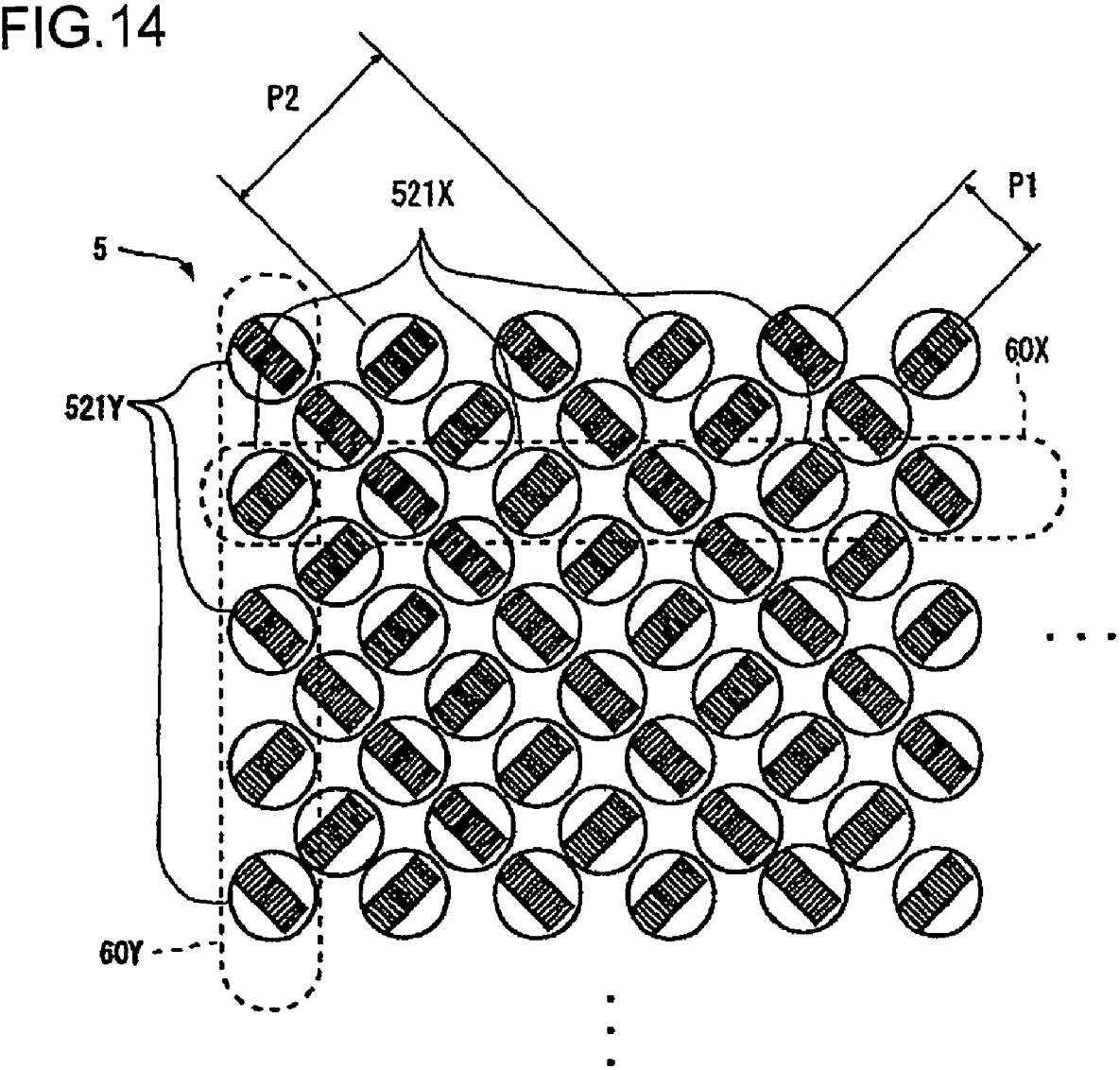
FIG. 14
Yet another example of a variation of the focal point detection unit 5

(6) In addition, the positional arrangement shown in FIG. 12 may be modified to that shown in FIG. 14. The focal point detection unit 5 in FIG. 14 assumes different pitches along the first direction and along the second direction. Namely, a first direction array pitch P1 and a second direction array pitch P2 are different from each other. In this focal point detection unit 5, micro-lenses are disposed with a smaller array pitch P1, i.e., micro-lenses are disposed with a higher level of density, making it possible to improve the detection accuracy along the corresponding direction.

Figure 15:
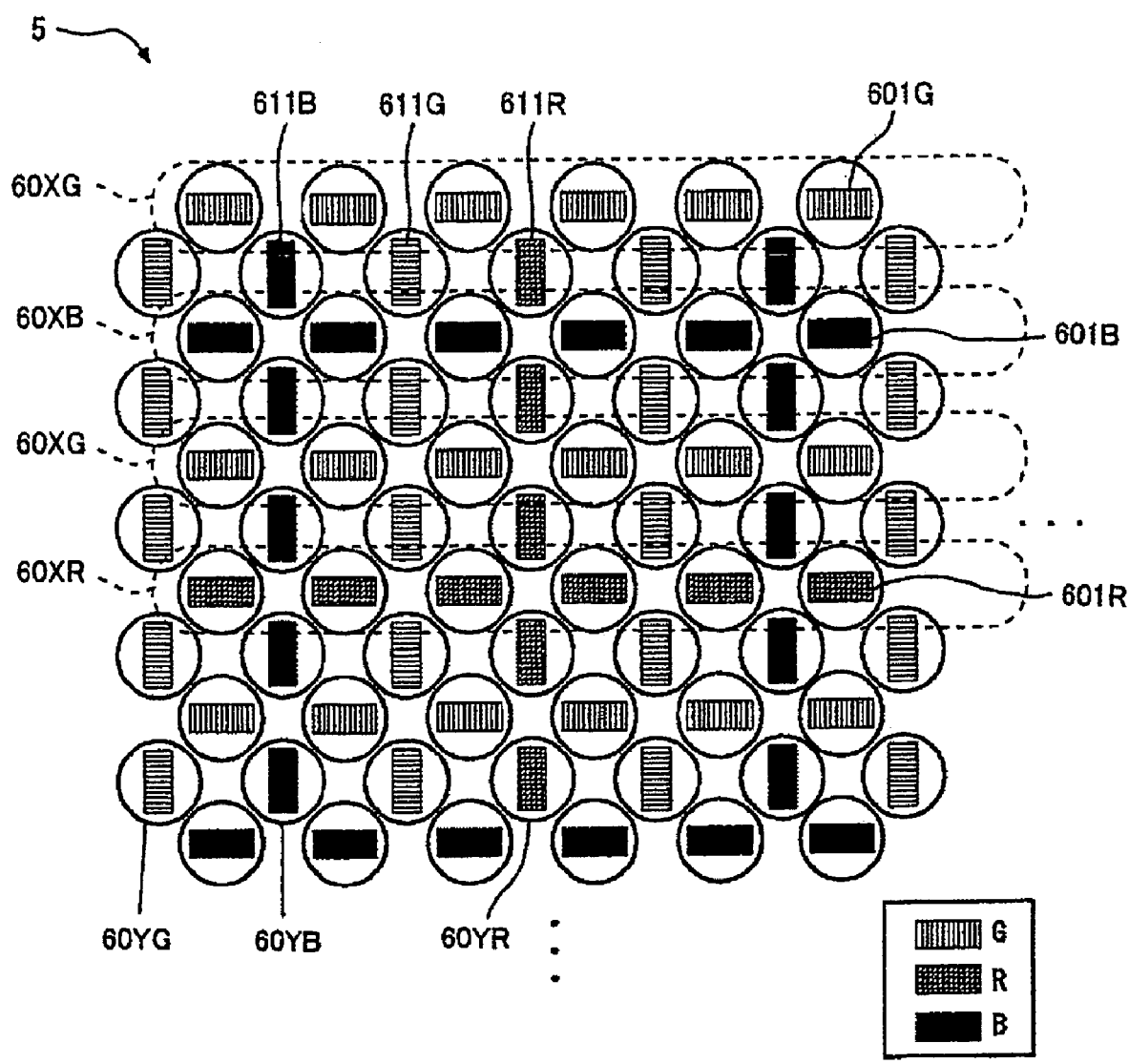
FIG. 15
Yet another example of a variation of the focal point detection unit 5

(7) While any spectral sensitivity that the focal point detection unit 5 may assume is not specially mentioned in reference to the embodiment, specific spectral sensitivity characteristics may be assumed by the focal point detection unit 5. FIG. 15 is a front view of the focal point detection unit 5 assuming certain spectral sensitivity characteristics. FIG. 15 shows a plurality of optical systems 60XR sensitive to R (red), a plurality of optical systems 60XG sensitive to G (green) and a plurality of optical systems 60XB sensitive to B (blue), all disposed along an X direction. In addition, a plurality of optical systems 60YR sensitive to R (red), a plurality of optical systems 60YG sensitive to G (green) and a plurality of optical systems 60YB sensitive to B (blue) are all disposed along the Y direction.

Namely, a plurality of first detection optical systems 60XG, 60XB and 60XR in the focal point detection unit 5 shown in FIG. 15 respectively include light-receiving portion groups 601G, 601B and 601R achieving spectral sensitivity characteristics different from one another and the plurality of second detection optical systems 60YG, 60YB and 60YR respectively include light-receiving portion groups 611G, 611B and 611R achieving varying spectral sensitivity characteristics.

It is to be noted that while the line sensor in each of the optical systems 60XB and 60YB is solidly filled in the figure, the line sensor actually includes a plurality of photoelectric conversion elements disposed therein.

It is desirable to dispose the optical systems 60XG and 60YG sensitive to green among the three types of optical systems, i.e., the optical systems 60XR and 60YR, the optical systems 60XG and 60YG and the optical systems 60XB and 60YB, at higher density than the other two types of optical systems, i.e., the optical systems 60XR and 60YR and the optical systems 60XB and 60YB, so as to weight the spectral sensitivity characteristics of the focal point detection unit 5 as a whole so as to approximate the spectral sensitivity characteristics of the human eye, which is more sensitive to green.

In addition, it is advantageous to dispose the green-sensitive optical systems at higher density since the green-sensitive optical systems are primarily used in detection operation.

(8) While three different types of optical systems sensitive to three different visible light colors, i.e., the optical systems 60XR and 60YR, the optical systems 60XG and 60YG and the optical systems 60XB and 60YB, are arrayed in the focal point detection unit shown in FIG. 15, the focal point detection unit may instead assume an array of two different types of optical systems, one type of optical systems sensitive to visible light and another type of optical systems sensitive to visible light and infrared light.

In either case, the defocus quantity can be detected in reference to a plurality of types of spectral sensitivity which are different from one another, and thus, the level of chromatic aberration manifested by the photographic lens 100 can be detected, which, in turn, makes it possible to correct such chromatic aberration. As a result, the focal point detection accuracy can be further improved.

Figure 16:
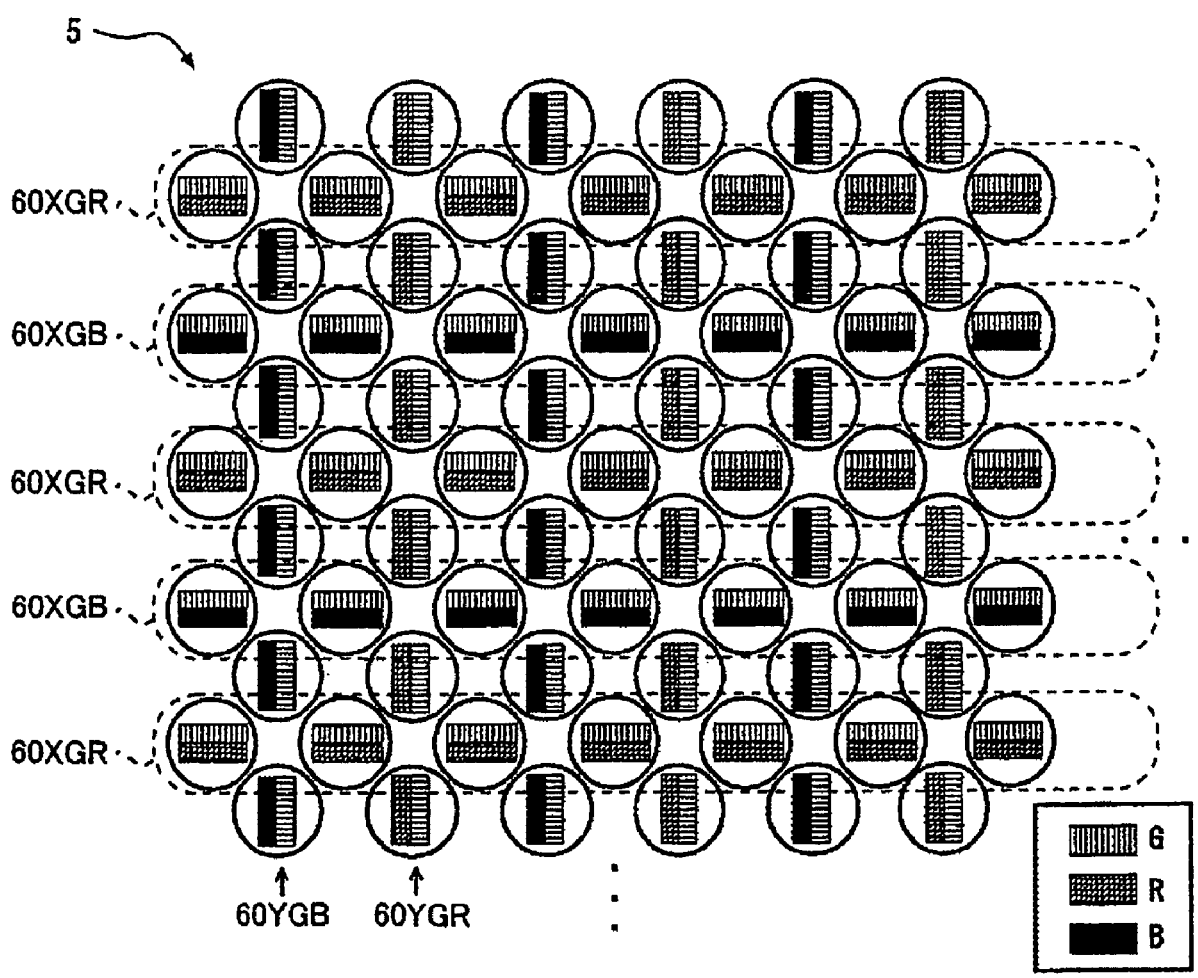
FIG. 16
Yet another example of a variation of the focal point detection unit 5
Figure 17:
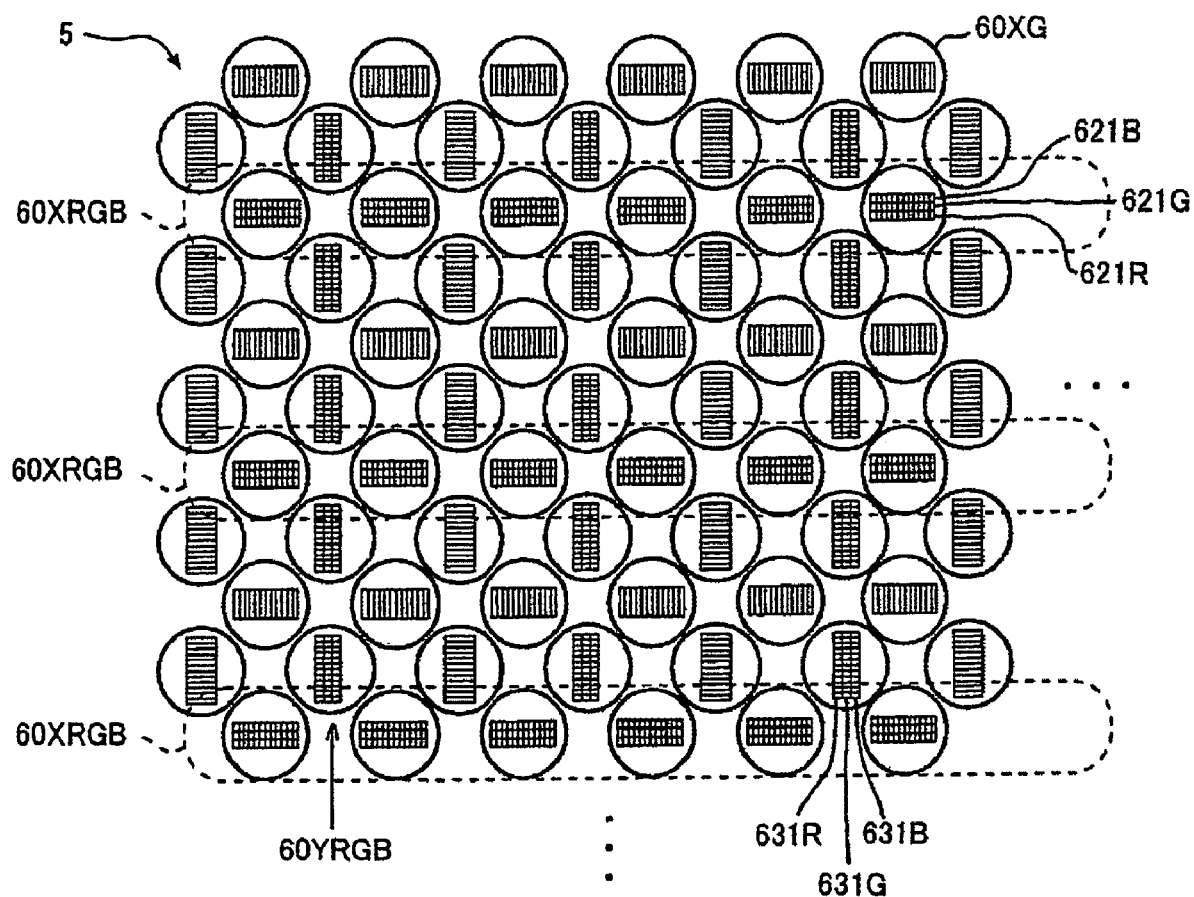
FIG. 17
Yet another example of a variation of the focal point detection unit 5

(9) While each type of optical system in the focal point detection unit 5 shown in FIG. 15, i.e., the optical systems 60XR and 60YR, the optical systems 60XG and 60YG or the optical systems 60XB and 60YB, detect a single color (wavelength), the focal point detection unit may instead include various types of optical systems, each capable of detecting two or more colors (wavelength) as shown in FIG. 16 or FIG. 17.

FIG. 16 shows a focal point detection unit 5 that includes optical systems each capable of detecting two different colors along a given detection row. In FIG. 16, reference numerals 60XGR and 60YGR indicate optical systems capable of detecting green and red, reference numerals 60XGB and 60YGB indicate optical systems capable of detecting green and blue. In the optical systems 60XGR and 60YGR, line sensors sensitive to green and line sensors sensitive to red are disposed parallel to each other to the rear of common micro-lenses, whereas in the optical systems 60XGB and 60YGB, line sensors sensitive to green and line sensors sensitive to blue are disposed parallel to each other to the rear of common micro-lenses. Both types of optical systems include green-sensitive line sensors so as to keep up a desired level of detection density even though the focal point detection unit is equipped with optical systems each capable of multiple color detection.

FIG. 17 shows a focal point detection unit 5 that includes optical systems each capable of detecting three different colors along a given detection row. In FIG. 17, reference numerals 60XRGB and 60YRGB indicate optical systems capable of detecting red, green and blue. The optical systems 60XRGB include line sensors 621G sensitive to green, line sensors 621R sensitive to red and line sensors 621B sensitive to blue disposed in parallel to one another to the rear of common micro-lenses, whereas the optical systems 60YRGB include line sensors 631G sensitive to green, line sensors 631R sensitive to red and line sensors 631B sensitive to blue disposed parallel to one another to the rear of common micro-lenses.

In addition, the green sensitive sensor arrays, i.e., the primary detection arrays, assume a greater width and the red sensitive sensor arrays and the blue sensitive sensor arrays used as auxiliary detection arrays assume a smaller width, so as to keep up the performance level even though the optical systems each detect multiple colors, while ensuring the standard detection capability.

It is to be noted that a wider green-sensitivity distribution should be assumed compared to that of a standard image sensor. For instance, the green-sensitivity distribution should assume a range equal to or greater than the visibility distribution so as to ensure that a sufficient quantity of light is received.

(10) While the focal point detection unit 5 described earlier includes the first optical systems having the micro-lens arrays 52 and the line sensor arrays 53 disposed along the lateral direction and the second optical systems having the micro-lens arrays 52 and the line sensor arrays 53 disposed along the longitudinal direction, set so as to alternate with each other, the first optical systems and the second optical systems do not need to assume an exact alternate pattern.

Figure 18:
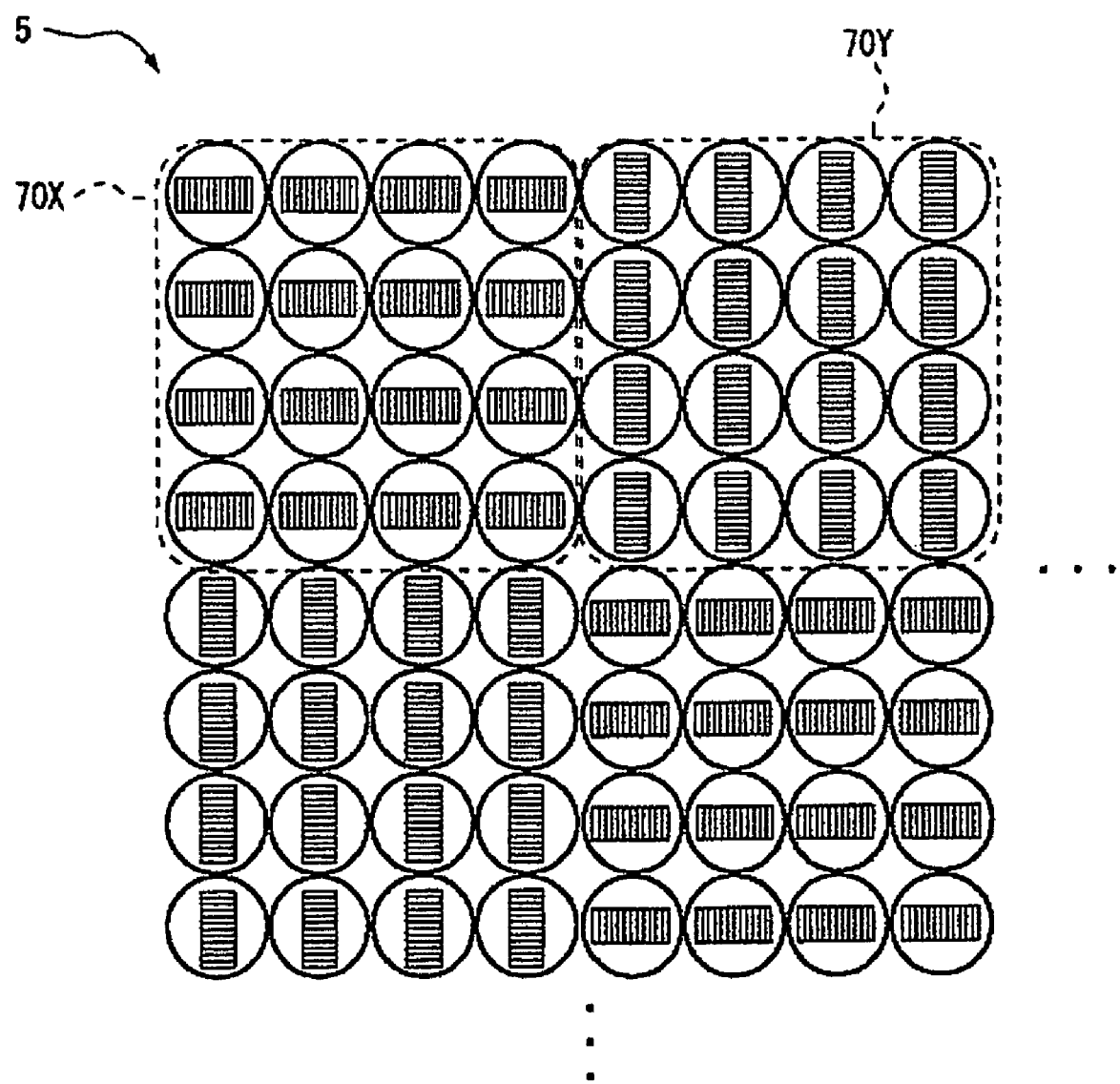
FIG. 18
Yet another example of a variation of the focal point detection unit 5

(11) FIG. 18 shows a focal point detection unit 5 having blocks 70X each constituted with a dense array of first optical systems and blocks 70Y each constituted with a dense array of second optical systems, with the blocks 70X and 70Y disposed alternately with each other.

(12) While a photoelectric conversion element array is disposed in correspondence to each micro-lens in the explanation provided above, a single photoelectric conversion element array achieved by integrating the plurality of photoelectric conversion element arrays may be disposed along each row, or the plurality of photoelectric conversion element arrays may be embodied as two-dimensional imaging elements. In addition, the two-dimensional arrangement in each of FIGS. 12 through 18 may be modified by rotating the angle of the individual structural elements by a given angle, e.g., by 45°.

(13) While an electronic camera system equipped with the image forming state detection device (focal point detection device) is described in reference to the embodiment, the image forming state detection device achieved in the embodiment of the present invention may be installed in any of various types of image forming optical apparatuses such as a field scope to achieve similar advantages, as long as the optical apparatus includes an image forming optical system.

(14) The image forming state detection device in the embodiment of the present invention may be adopted in measurement of an aberration manifesting in an optical system, since as the image forming state detection device in the embodiment of the present invention is engaged in measurement of the defocus quantity indicating the extent of defocusing attributable to the pupil area of the target optical system and in measurement of the defocus quantity indicating the extent of defocusing manifesting at each image height, the extent of aberration of the target optical system can be determined as a result. An aberration measurement apparatus equipped with the image forming state detection device in the embodiment of the present invention should comprise, for instance, a mechanism that supports the target optical system, an illuminating optical system that casts measurement light toward the detection target optical system from the object side, the image forming state detection device in the embodiment of the present invention, disposed on the image side of the detection target optical system, and an arithmetic operation device that calculates the extent of aberration manifested by the detection target optical system based upon the output provided by the image forming state detection device.

While the invention has been particularly shown and described with respect to a preferred embodiment and numerous variations thereof by referring to the attached drawings, the present invention is not limited to these examples and it will be understood by those skilled in the art that various changes in form and detail may be made therein without departing from the spirit, scope and teaching of the invention.

The disclosure of the following priority application is herein incorporated by reference:

Japanese Patent Application No. 2005-157314 filed May 30, 2005

The invention claimed is:

1. An image forming state detection device, comprising:
   a micro-lens array that includes a plurality of micro-lenses arrayed with a predetermined pitch at a position set apart from a predetermined focal plane of an image forming optical system by a specific distance;
   a plurality of light-receiving element arrays each of which includes a plurality of light-receiving elements, each of the light-receiving elements outputting photoelectric conversion signal, each of the light-receiving element arrays being disposed corresponding to each of the micro-lenses;
   a first forming circuit that forms a first signal string (a(i): i=1, 2, 3, 4, . . . ) including the photoelectric conversion signals output from the light-receiving element array corresponding to one of the micro-lenses, and a second signal string (b(i):i=1, 2, 3, 4, . . . ) including the photoelectric conversion signals output from the light-receiving element array corresponding to another micro-lens;
   a second forming circuit that executes a process in which with regard to each of the plurality of the micro-lenses, signals a(i) and b(i) are extracted from the photoelectric conversion signals output from two of the light-receiving elements disposed at a predetermined position among the light-receiving element array corresponding to ith micro-lens, and that forms a first signal string (a(i):i=1, 2, 3, 4, . . . ) including the signals a(i) and a second signal string (b(i):i=1, 2, 3, 4, . . . ) including the signals b(i); and
   an image forming state calculating circuit that selects one of the first and second signal strings formed by the first forming circuit and the first and second signal strings formed by the second forming circuit based upon a predetermined decision-making criterion, and calculates an image forming state of the image forming optical system at the predetermined focal plane by detecting an offset based upon the selected first and second signal strings.

2. An image forming state detection device according to claim 1, wherein:
   the second forming circuit extracts the signals a(i) and b(i) by selecting specific light reception outputs corresponding to light fluxes passed through a same portion of a pupil of the image forming optical system at each of the plurality of light-receiving elements disposed in conjunction with each of the micro-lenses.

3. An image forming state detection device according to claim 2, wherein:
   the light-receiving element array includes a first array group with the plurality of light-receiving elements disposed along a first direction and a second array group with the plurality of light-receiving elements disposed along a second direction different from the first direction.

4. An image forming state detection device according to claim 1, wherein:
   a pitch Pd of images of the plurality of light-receiving elements reverse-projected onto the predetermined focal plane via the micro-lenses is smaller than a pitch P of the micro-lenses.

5. An image forming state detection device according to claim 1, wherein:
   the light-receiving element array includes light-receiving elements having different spectral sensitivity characteristics.

6. An image forming state detection device according to claim 5, wherein:
   light-receiving elements having specific spectral sensitivity characteristics are arrayed with a higher level of density than light-receiving elements having other spectral characteristics.

7. An image forming state detection device according to claim 6, wherein:
   sizes of the light-receiving elements having different spectral characteristics are different from one another.

8. A camera equipped with an internal focal point detection device constituted with the image forming state detection device according to claim 1.

9. A light receiving unit, comprising the micro-lens array and the light-receiving element array in the image forming state detection device according to claim 1.

10. An image forming state detection device, comprising:
    a micro-lens array that includes a plurality of micro-lenses arrayed with a predetermined pitch at a position set apart from a predetermined focal plane of an image forming optical system by a specific distance, the specific distance being determined based upon a pitch with which the micro-lenses are arrayed and a size of the portion of the pupil;
    a plurality of light-receiving element arrays each of which includes a plurality of light-receiving elements, each of the light-receiving elements outputting a photoelectric conversion signal, each of the light-receiving element arrays being disposed corresponding to each of the micro-lenses;

a first forming circuit that forms a first signal string (a(i): i=1, 2, 3, 4, ...) including the photoelectric conversion signals output from the light-receiving element array corresponding to one of the micro-lenses, and a second signal string (b(i):i=1, 2, 3, 4, ...) including the photoelectric conversion signals output from the light-receiving element array corresponding to another micro-lens;

a second forming circuit that executes a process in which with regard to each of the plurality of the micro-lenses, signals a(i) and b(i) are extracted from the photoelectric conversion signals output from two of the light-receiving elements disposed at a predetermined position among the light-receiving element array corresponding to ith micro-lens, and forms a first signal string (a(i):i=1, 2, 3, 4, ...) including the signals a(i) and a second signal string (b(i):i=1, 2, 3, 4, ...) including the signals b(i); and an image forming state calculating circuit that selects one of the first and second signal strings formed by the first forming circuit and the first and selects one of the second signal strings formed by the second signal forming circuit based upon a predetermined decision-making criterion, and calculates an image forming state of the image forming optical system at the predetermined focal plane by detecting an offset based upon the selected first and second signal strings.

11. An image forming state detection device according to claim 2, wherein:
the specific distance L is determined based upon a pitch with which the micro-lenses are arrayed and a size of the portion of the pupil.

12. An image forming state detection device according to claim 10, wherein:
with P representing the pitch with which the micro-lenses are arrayed, Fp representing an F value in relation to light fluxes from the portion of the pupil that enter one of the light-receiving elements and Q representing a number of portions of the pupil defined when the F value in relation to the light fluxes from the portions of the pupil is 2, the specific distance L is expressed as;

$P \times Fp > L \geq P \times Fp/(Q-4)$.

13. An image forming state detection device, comprising:
a micro-lens array that includes a plurality of micro-lenses arrayed with a predetermined pitch at a position set apart from a predetermined focal plane of an image forming optical system by a specific distance;

a light-receiving element array that includes a plurality of light-receiving element groups, each of which is constituted of a plurality of light-receiving elements, each of the light-receiving elements outputting a photoelectric conversion signal, each of the light-receiving element groups being disposed corresponding to each of the micro-lenses;

a first forming circuit that forms a first signal string (a(i): i=1, 2, 3, 4, ...) including the photoelectric conversion signals output from one of the light-receiving element groups corresponding to one of the micro-lenses, and a second signal string (b(i):i=1, 2, 3, 4, ...) including the photoelectric conversion signals output from the light-receiving element groups corresponding to another micro-lens;

a second forming circuit that executes a process in which with regard to each of the plurality of the micro-lenses, signals a(i) and b(i) are extracted from the photoelectric conversion signals output from two of the light-receiving elements disposed at a predetermined position among the light-receiving element group corresponding to ith micro-lens, and that forms a first signal string (a(i):i=1, 2, 3, 4, ...) including the signals a(i) and a second signal string (b(i):i=1, 2, 3, 4, ...) including the signals b(i);

an image forming state calculating circuit that selects one of the first and second signal strings formed by the first forming circuit and the first and second signal strings formed by the second signal forming circuit based upon a predetermined decision-making criterion, and calculates an image forming state of the image forming optical system at the predetermined focal plane by detecting an offset based upon the selected first and second signal strings.

14. An image forming state detection device, comprising:
a micro-lens array that includes a plurality of micro-lenses arrayed at a position set apart from a predetermined focal plane of an image forming optical system by a specific distance;

a light-receiving element array that includes first light-receiving element array groups with a plurality of light-receiving elements disposed along a first direction and second light-receiving element array groups with the plurality of light-receiving elements disposed along a second direction different from the first direction, each of the light-receiving elements outputting a photoelectric conversion signal, each of the light-receiving element array groups being disposed corresponding to each of the micro-lenses;

a first forming circuit that forms a first signal string (a(i): i=1, 2, 3, 4, ...) including the photoelectric conversion signals output from the light-receiving element array groups corresponding to one of the micro-lenses, and a second signal string (b(i):i=1, 2, 3, 4, ...) including the photoelectric conversion signals output from the light-receiving element array groups corresponding to the other micro-lens;

a second forming circuit that executes a process in which with regard to each of the plurality of the micro-lenses, signals a(i) and b(i) are extracted from the photoelectric conversion signals output from two of the light-receiving elements disposed at a predetermined position among the light-receiving element group corresponding to ith micro-lens, and forms a first signal string (a(i):i=1, 2, 3, 4, ...) including the signals a(i) and a second signal string (b(i):i=1, 2, 3, 4, ...) including the signals b(i);

an image forming state calculating circuit that selects one of the first and second signal strings formed by the first forming circuit and the first and second signal strings formed by the second signal forming circuit based upon a predetermined decision-making criterion, and calculates an image forming state of the image forming optical system at the predetermined focal plane by detecting an offset based upon the selected first and second signal strings.

15. An image forming state detection device according to claim 14, wherein:
light-receiving element/micro-lens pairs made up with the light-receiving elements disposed along the first direction and micro-lenses corresponding to the light-receiving elements,/and light-receiving element/micro-lens pairs made up with the light-receiving elements disposed along the second direction and micro-lenses corresponding to the light-receiving elements are set so as to achieve a checkerboard pattern.

16. An image forming state detection device according to claim 14, wherein:
the first light-receiving element array group and the second light-receiving element array group are set so as to achieve a checkerboard pattern.

17. An image forming state detection device according to claim 14, wherein:
the micro-lenses corresponding to the first light-receiving element array group and the micro-lenses corresponding to the second light-receiving element array group are each arrayed with a different pitch.

18. An image forming state detection device according to claim 14, wherein:
the light-receiving elements in the first array group each assume a range along the first direction, the range being greater than a range assumed by the light-receiving elements in the second array group along the second direction.

19. An image forming state detection device according to claim 14, wherein:
the first light-receiving element array group includes a plurality of light receiving array groups having different spectral sensitivity characteristics.

20. An image forming state detection device according to claim 19, wherein:
the plurality of light-receiving array groups each include light-receiving elements having specific spectral sensitivity characteristics.

* * * * *